United States Patent
Parkinson et al.

(10) Patent No.: US 10,606,439 B2
(45) Date of Patent: Mar. 31, 2020

(54) AUDIBLE AND VISUAL OPERATIONAL MODES FOR A HEAD-MOUNTED DISPLAY DEVICE

(71) Applicant: RealWear, Incorporated, Vancouver, WA (US)

(72) Inventors: Christopher Iain Parkinson, Richland, WA (US); Sanjay Subir Jhawar, Menlo Park, CA (US); Stephen A. Pombo, Campbell, CA (US); Kenneth Lustig, Mercer Island, WA (US)

(73) Assignee: Realwear, Inc., Vancouver, WA (US)

( * ) Notice: Subject to any disclaimer, the term of this patent is extended or adjusted under 35 U.S.C. 154(b) by 0 days.

(21) Appl. No.: 16/420,025

(22) Filed: May 22, 2019

(65) Prior Publication Data

US 2019/0286283 A1 Sep. 19, 2019

Related U.S. Application Data

(63) Continuation of application No. 15/697,281, filed on Sep. 6, 2017, now Pat. No. 10,338,766.

(51) Int. Cl.
*G06F 3/01* (2006.01)
*G06F 3/0481* (2013.01)
(Continued)

(52) U.S. Cl.
CPC .......... *G06F 3/0481* (2013.01); *G06F 1/163* (2013.01); *G06F 1/1694* (2013.01); *G06F 3/011* (2013.01); *G06F 3/013* (2013.01); *G06F 3/0362* (2013.01); *H04R 1/028* (2013.01); *H04R 1/1041* (2013.01); *H04S 7/304* (2013.01); *G08B 3/10* (2013.01); *G08B 5/36* (2013.01); *H04R 1/1008* (2013.01);
(Continued)

(58) Field of Classification Search
CPC ........ G06F 1/163; G06F 1/1694; G06F 3/011; G06F 3/013; G06F 3/0362; G06F 3/0481; G08B 3/10; G08B 5/36; H04R 1/028; H04R 1/1008; H04R 1/1041; H04S 2400/11; H04S 2400/15; H04S 7/304
USPC ......................................... 345/156, 427, 633
See application file for complete search history.

(56) References Cited

U.S. PATENT DOCUMENTS

| | | | |
|---|---|---|---|
| 8,830,142 B1 * | 9/2014 | Kim ........................ | G06F 3/011 345/8 |
| 9,664,902 B1 * | 5/2017 | Raffle .................... | G02B 27/01 |

(Continued)

*Primary Examiner* — Tony O Davis
(74) *Attorney, Agent, or Firm* — Shook, Hardy & Bacon L.L.P.

(57) ABSTRACT

The invention is directed towards wearable devices and operating wearable devices in a visual mode when a display device of the wearable device is within a line-of-sight (LOS) of a user and operating the wearable device in an audible mode when the wearable device is outside the LOS of the user. The position of the display device, relative to the user's LOS, is automatically determined. The operational mode of the wearable device is automatically transitioned when a transition of position of the display device is detected. The wearable device may be a head-mounted display (HMD) device. A visual mode provides visual-based presentations of UIs, content, information, and data, via the display device. In contrast to a visual mode, an audible mode provides audio-based presentations of UIs, content, information, and data, via one or more audible speakers included in the wearable device.

20 Claims, 20 Drawing Sheets

(51) Int. Cl.
  *H04R 1/02*     (2006.01)
  *G06F 3/0362*   (2013.01)
  *G06F 1/16*     (2006.01)
  *H04R 1/10*     (2006.01)
  *H04S 7/00*     (2006.01)
  *G08B 5/36*     (2006.01)
  *G08B 3/10*     (2006.01)

(52) U.S. Cl.
  CPC ....... *H04S 2400/11* (2013.01); *H04S 2400/15* (2013.01)

(56) References Cited

U.S. PATENT DOCUMENTS

| | | |
|---|---|---|
| 2006/0187628 A1 | 8/2006 | Le et al. |
| 2010/0199232 A1 | 8/2010 | Mistry et al. |
| 2011/0001695 A1 | 1/2011 | Suzuki et al. |
| 2011/0106339 A1* | 5/2011 | Phillips ............... G05D 1/0033 701/2 |
| 2011/0234484 A1* | 9/2011 | Ogawa ............... A61B 1/00039 345/156 |
| 2011/0249122 A1 | 10/2011 | Tricoukes et al. |
| 2012/0239747 A1 | 9/2012 | Kilmer et al. |
| 2013/0147686 A1 | 6/2013 | Clavin et al. |
| 2013/0188080 A1 | 7/2013 | Olsson et al. |
| 2014/0160129 A1* | 6/2014 | Sako ....................... G06F 3/011 345/427 |
| 2014/0176398 A1 | 6/2014 | West et al. |
| 2014/0375540 A1* | 12/2014 | Ackerman ............. G06F 3/013 345/156 |
| 2014/0375687 A1* | 12/2014 | Tanaka ................ G02B 27/0172 345/633 |
| 2015/0084850 A1 | 3/2015 | Kim et al. |
| 2015/0097759 A1 | 4/2015 | Evans et al. |
| 2015/0130711 A1* | 5/2015 | Lee ....................... G02B 27/017 345/156 |
| 2015/0138064 A1* | 5/2015 | Li .......................... G02B 27/017 345/156 |
| 2015/0234456 A1* | 8/2015 | Cho ........................ G06F 3/011 345/156 |
| 2016/0062457 A1* | 3/2016 | Kobayashi ............. G06F 3/013 345/156 |
| 2016/0210780 A1* | 7/2016 | Paulovich ................ G06T 7/73 |
| 2016/0225192 A1 | 8/2016 | Jones et al. |
| 2016/0238642 A1 | 8/2016 | Akselrod et al. |
| 2016/0238842 A1* | 8/2016 | Sendai ............... G02B 27/0176 |
| 2016/0313790 A1 | 10/2016 | Clement et al. |
| 2016/0334628 A1* | 11/2016 | Lyons ................ G02B 27/0172 |
| 2016/0378176 A1* | 12/2016 | Shiu ........................ G06F 3/011 345/633 |
| 2017/0045746 A1* | 2/2017 | Ellsworth ................. G02B 5/30 |
| 2017/0140618 A1 | 5/2017 | Dow et al. |
| 2017/0192235 A1* | 7/2017 | Petrov ................ G02B 27/0172 |
| 2017/0295360 A1* | 10/2017 | Fu ......................... H04N 13/271 |
| 2017/0364144 A1* | 12/2017 | Petrov ..................... G06F 3/012 |
| 2018/0130227 A1* | 5/2018 | Sato ......................... G06T 7/70 |
| 2018/0246565 A1* | 8/2018 | Moon ..................... G06F 3/012 |
| 2019/0129500 A1* | 5/2019 | Shen ...................... G06F 3/012 |

\* cited by examiner

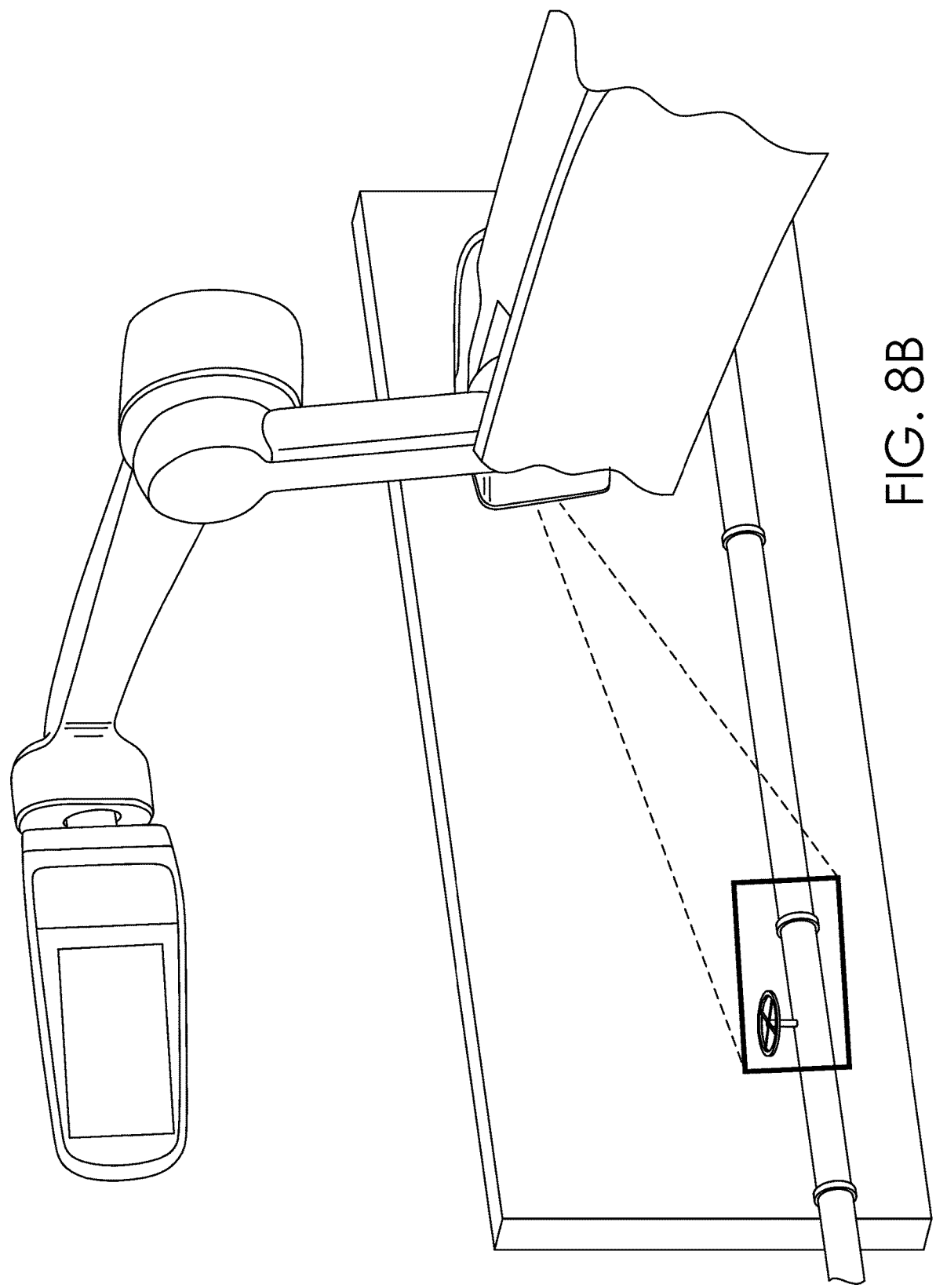

AUDIBLE AND VISUAL OPERATIONAL MODES FOR A HEAD-MOUNTED DISPLAY DEVICE

CROSS REFERENCE TO RELATED APPLICATIONS

The present application is a continuation of and claims priority from application Ser. No. 15/697,281 filed Sep. 6, 2017, which is assigned or under obligation of assignment to the same entity as this application, the entire contents of the application being herein incorporated by reference.

BACKGROUND

Wearable devices, such as head-mounted display (HMD) devices, have enabled users to conveniently transport and access computing capabilities, while located in (and during transit to) remote and/or non-traditional computing environments. That is, users seeking access to computing capabilities no longer require desktop-based computing devices and Ethernet ports. Rather, users may now conveniently "wear" a computing device (i.e. a wearable device) to a remote location. The wearable device is enabled to provide various computing capabilities that may exceed the capabilities of many desktop-based computing devices. Often, such wearable devices provide access to computing capabilities via user-interfaces (UIs) displayed by a display device embedded within the wearable device.

However, in some circumstances, it may be unsafe or otherwise undesirable to have the user diverting their glance (or attention) to the display device or otherwise positioning the display device within the user's view. For instance, a display of a HMD device may restrict the user's view of, or otherwise divert the user's attention away from, their environment or immediate surroundings. For example, within industrial and other settings, there may exist particular scenarios where limiting the user's view or attention to a display poses significant safety risks to the user, as well as others. Thus, in such scenarios, the user may remove the display from their view, or otherwise divert their glance away from the general direction of the display. However, even when the display is not within their view, it is still desirable for enabling users to access to at least a portion of the computing capabilities provided by the wearable device. It is for these and other concerns that the following disclosure is provided.

SUMMARY OF THE INVENTION

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

At a high level, embodiments of the present invention are generally directed to operating wearable devices in a visual mode when a display device of the wearable device is within a line-of-sight (LOS) of a user and operating the wearable device in an audible mode when the wearable device is outside the LOS of the user. The various embodiments may automatically determine when the display device is within and excluded from the LOS of the user. The embodiments may automatically transition the operational mode of the wearable device when a transition of position of the display device is detected. The wearable device may be a head-mounted display (HMD) device. Although other embodiments are not so limited, and may be directed towards other computing devices such as other wearable devices or mobile devices.

Briefly, a visual mode is an operational mode of a wearable device that provides visual-based presentations of UIs, content, information, data, and the like, via the display device included in the wearable device. Such visual-based presentations include various visual elements, visual indications, and/or visual content that enable the user to receive information, control the wearable device, and access capabilities of the wearable device through interactions with the visual-based presentations of one or more UIs.

In contrast to a visual mode, an audible mode is an operational mode of a wearable device that provides audio-based presentations of UIs, content, information, data, and the like, via one or more audible speakers included in the wearable device. Such audio-based presentations include spoken-word, audible elements, audible indications, and/or audible content that enable the user to receive information, control the wearable device, and access capabilities of the wearable device through interactions with the audio-based presentations of UIs. Furthermore, interaction with visual-based and/or audio-based presentations of UIs may be at least partially speech-driven. That is, the user may control the wearable device (in either audible and/or visual mode) herein and access various capabilities of the wearable device via verbally speaking voice-activated commands that are detected by one or more other electroacoustic transducers (e.g. a microphone) included in the wearable device.

BRIEF DESCRIPTION OF THE DRAWINGS

The features of the invention noted above are explained in more detail with reference to the embodiments illustrated in the attached drawing figures, in which like reference numerals denote like elements, in which FIGS. 1-6 illustrate an embodiment of the present invention and in which:

FIG. 1 provides a schematic diagram showing an exemplary operating environment for operating a head-mounted display device, in accordance with some implementations of the present disclosure;

FIG. 2 shows an exemplary embodiment of a head-mounted display device, in accordance with some implementations of the present disclosure;

FIG. 8B provides a schematic diagram showing operations of an exemplary embodiment of an audible mode of an augmented-reality enabled head-mounted display device, in accordance with some implementations of the present disclosure;

DETAILED DESCRIPTION

Figure 1:
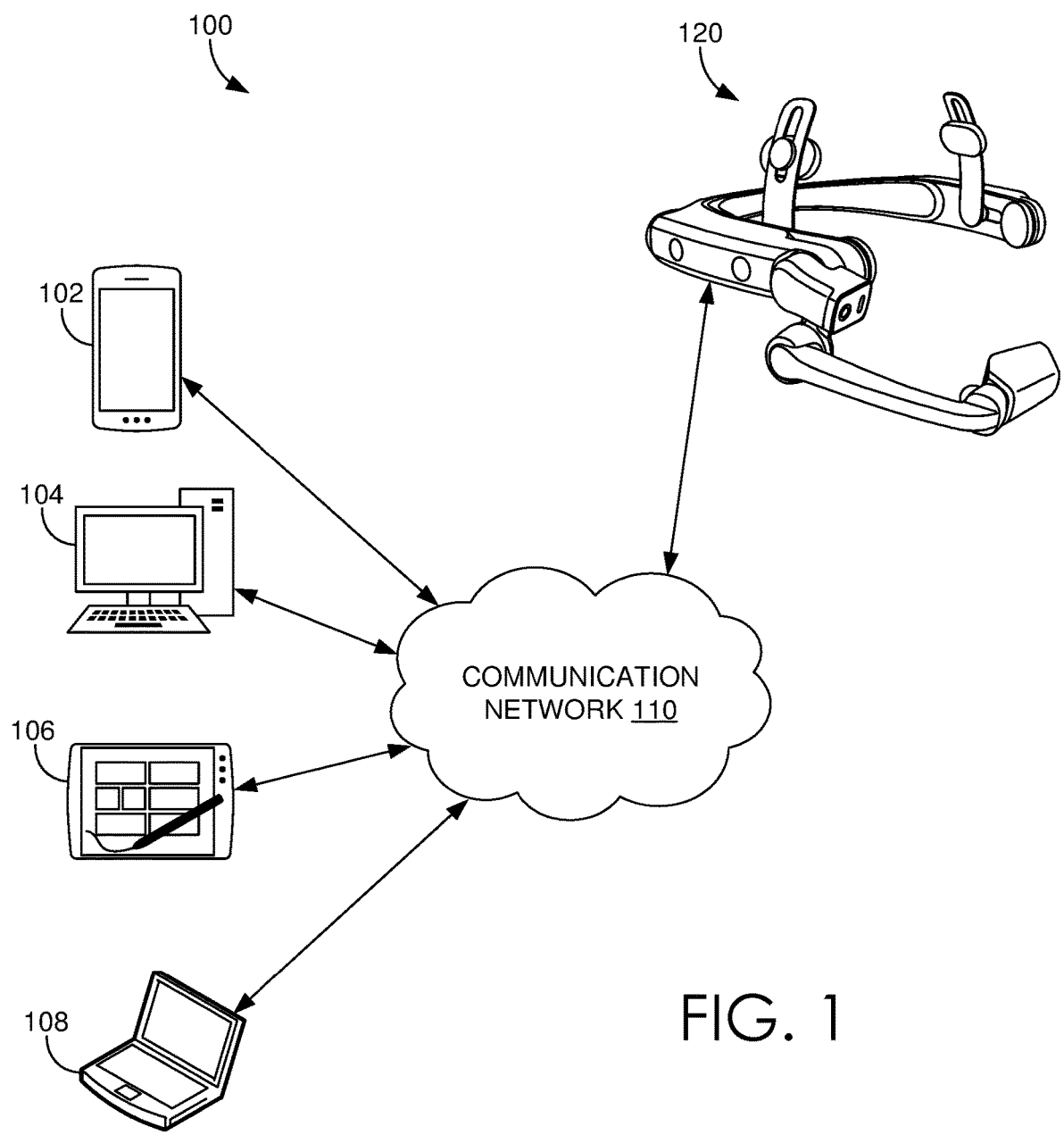

The various embodiments herein are directed towards methods and systems for operating mobile devices, such as but not limited to wearable devices in a visual mode when a display device of the wearable device is within the user's LOS and operating the wearable device in an audible mode when the display device is excluded from the user's LOS. More particularly, the various embodiments may automatically detect when the display device is within the user's LOS and when the display is excluded from the user's LOS. Based upon such detections of the position of the display device (relative to the user's LOS), or alternatively based upon detecting transitions of the position of the display, the wearable device may be operated in (or transitioned to) the corresponding operational mode. In various embodiments, the user's LOS may be construed broadly to include anywhere within the eyesight (or field-ofview) of the user. For instance, the display device may be considered to be within the user's LOS when the display device is positioned within the user's periphery vision, or when the display device is above or below the user's pupils, but the user can still visually see the display device. In at least one embodiment, the display device is within the user's LOS when the user may track and/or focus on the display device via the manual rotation of their eyes within their orbital sockets.

Many of the capabilities provided by conventional mobile technologies are accessed, at least partially, via the user viewing and interacting with user-interfaces (UIs) provided by one or more display devices. For instance, mobile devices such as conventional wearable devices provide information and enable users to control and access computing capabilities via UIs viewable on a display device integrated with the wearable device. That is, some UIs that enable the user to control the mobile device, to view documents, to receive notifications, to provide user selections, or otherwise access and/or control many of the capabilities associated with the wearable device require an active visual observation, of a display device, by the user.

In addition to the user's attentive eyesight, such UIs often require manual and/or physical manipulation by the user, i.e. the use of the user's hands and/or fingertips is required. For example, a user may view a touch-sensitive display device of wearable device and perform manual gestures via a stylus, their hands, and/or their fingertips to interact with a UI.

However, it may not always be convenient, or even safe, for the user to orient their line-of-sight (LOS) to include the display device, or otherwise position the display device within their LOS. Additionally, even if a user may divert their LOS or attention towards a display device, it may still be inconvenient or unsafe for the user to use their hands and/or fingertips to interact with the UI.

For example, within industrial and other settings, there may exist particular scenarios where restricting or limiting the user's LOS or attention to a display device poses significant safety risks to the user, as well as others. In such scenarios, the user may remove the display device from their LOS, or otherwise divert their LOS away from the general direction of the display device. However, even when the display device is not within the user's LOS, or it is inconvenient or unsafe for the user to user their hands to interact with the display device or another selection input-device, it is still desirable for the user to control the wearable device and access computing capabilities provide by the wearable device.

To address such concerns and limitations, the various embodiments herein are directed towards methods and systems for operating wearable devices in a visual mode when a display device of the wearable device is within the user's LOS and operating the wearable device in an audible mode when the display device is excluded from the user's LOS. Briefly, a visual mode is an operational mode of a wearable device that provides visual-based presentations of UIs, content, information, data, and the like, via the display device included in the wearable device. Such visual-based presentations include various visual elements, visual indications, and/or visual content that enable the user to receive information, control the wearable device, and access capabilities of the wearable device through interactions with the visual-based presentations of one or more UIs.

In contrast to a visual mode, an audible mode is an operational mode of a wearable device that provides audio-based presentations of UIs, content, information, data, and the like, via one or more audible speakers included in the wearable device. Such audio-based presentations include spoken-word, audible elements, audible indications, and/or audible content that enable the user to receive information, control the wearable device, and access capabilities of the wearable device through interactions with the audio-based presentations of UIs. Furthermore, interaction with visual-based and/or audio-based presentations of UIs may be at least partially speech-driven. That is, the user may control the wearable device (in either audible and/or visual mode) herein and access various capabilities of the wearable device via verbally speaking voice-activated commands that are detected by one or more other electroacoustic transducers (e.g. a microphone) included in the wearable device.

Although many of the embodiments discussed herein are directed towards operating (and transitioning between) visual and audible modes of a head-mounted display (HMD) device, it should be understood that not all embodiments are so limited. That is, it should be understood that the various embodiments discussed herein, may be applied to other computing devices, including but not limited to other wearable devices (e.g. smartwatches) and mobile devices (e.g. smartphones and tablets).

FIG. 1 provides a schematic diagram showing an exemplary operating environment 100 for operating a head-mounted display device in accordance with some implementations of the present disclosure. Environment 100 includes one or more wearable devices, such as but not limited to head-mounted display (HMD) device 120 and one or more user computing devices. Such user computing devices include, but are not otherwise limited to smartphone 102, desktop 104, tablet 106, and laptop 108. Various embodiments of HMD device 120 are discussed in conjunction with at least FIGS. 2A, 2B, 3, and 12. However, briefly here, HMD device 220 is a wearable computing device that provides computing and communication capabilities to the wearer. In the non-limiting body shown in FIG. 1, a wearable device (e.g. HMD device 120) may be worn about the head of the user. Other embodiments are not so limited. Various embodiments of user computing devices, such as computing devices 102-108 are discussed in conjunction with FIG. 13.

Environment 100 additionally includes a communication network, such as but not limited to communication network 110, which communicatively couples each of user computing devices 102-108 and HMD device 120. Communication network 110 may be any communication network, including virtually any wired and/or wireless communication technologies, wired and/or wireless communication protocols, and the like. It should be understood that communication network 110 may be virtually any network that communicatively couples at least one of user computing devices 102-108 with a wearable device, such as but not limited to HMD device 120.

Figure 2:
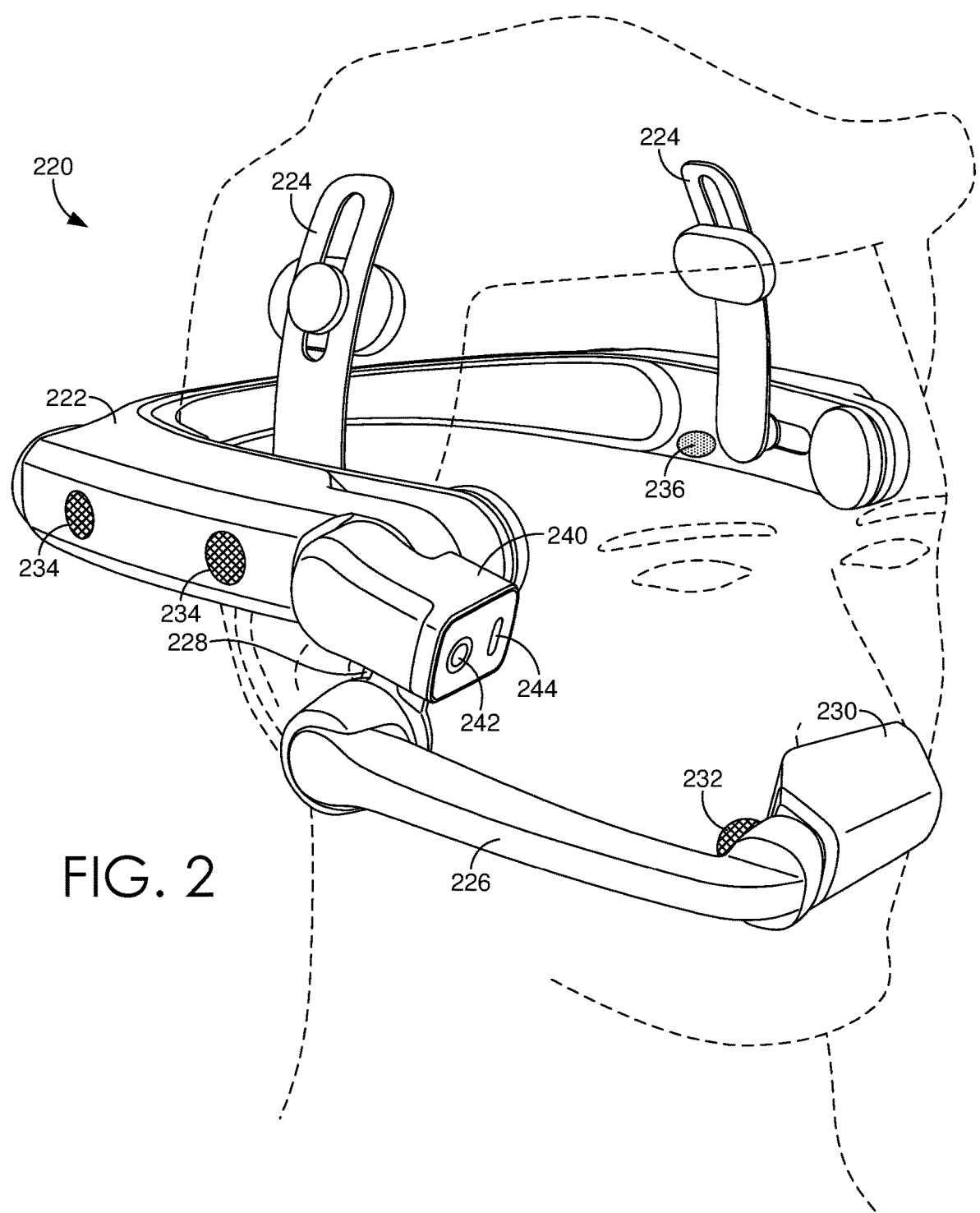

FIG. 2 shows an exemplary embodiment of a head-mounted display device 220, in accordance with some implementations of the present disclosure. HMD device 220 is a wearable device and may include similar features to that of wearable device 1200 of FIG. 12. HMD device 220 may be similar to HMD device 120 of FIG. 1. HMD device 220 includes a frame member 222. Frame member 222 may be a frame structure. As shown in FIG. 2, frame member 222 is configured and arranged for wearing by a user. For instance, frame member 222 may be worn about the user's head. HMD device 224 may additionally include one or more stabilizing members 224 (or stabilizing structures) that stabilize the frame member 222 about the user's head.

HMD device 220 may include one or more rotating members, such as but not limited to first rotating member 226 and second rotating member 228. As discussed in conjunction with FIGS. 3A-3B, at least one rotating members 226 or 228 is rotatably coupled to frame member 222, i.e. at least one of rotating members 226 or 228 is coupled to frame member and configured and arranged for rotating relative to frame member 222. In at least one embodiment, first rotating member 226 may be a boom arm that is coupled to a display module 230. Display module 230 houses a display device (not shown in FIG. 2) that is directed towards the eyes of the users. As shown in FIG. 2, the display device is within the user's line-of-sight (LOS). As discussed in conjunction with FIGS. 3A-3B, the user may re-position the display device, via a rotation of one or more of rotating members, such the display device is excluded from the user's LOS. Note that in the view of HMD device 220 shown in FIG. 2, the display device is occluded. However, various embodiments of the user's view of the display device (when the display device is within the user's LOS) are shown in FIGS. 4A, 5A, 6A, 7A, and 8A.

HMD device 220 includes various electroacoustic transducers (e.g. microphones and audio speakers). One such electro acoustic transducer 232 is located near a distal end of rotating member 226. Electroacoustic transducer 232 may be a primary microphone. In various embodiments, HMD device 220 includes one or other electroacoustic transducers, including but not limited to one or more auxiliary microphones 234 and one or more audio speakers, such as but not limited to audio speaker 236.

HMD device 220 may include an optical module 240 that houses one or more photon-detectors (e.g. camera devices), such as photon-detector 242 and/or one or more photon-emitters (e.g. scanning lasers, scanning light emitting diodes (LED), and the like), such as photon-emitter 244. Optical module 240 may be configured and arranged to rotate relative to frame member 222, such that the field-of-view (FOV) of the photon-detector 242 may be rotationally varied. In at least some rotational orientations of optical module 240, the FOV of photon-detector 242 is at least similar to the FOV of the user.

Figure 3A:
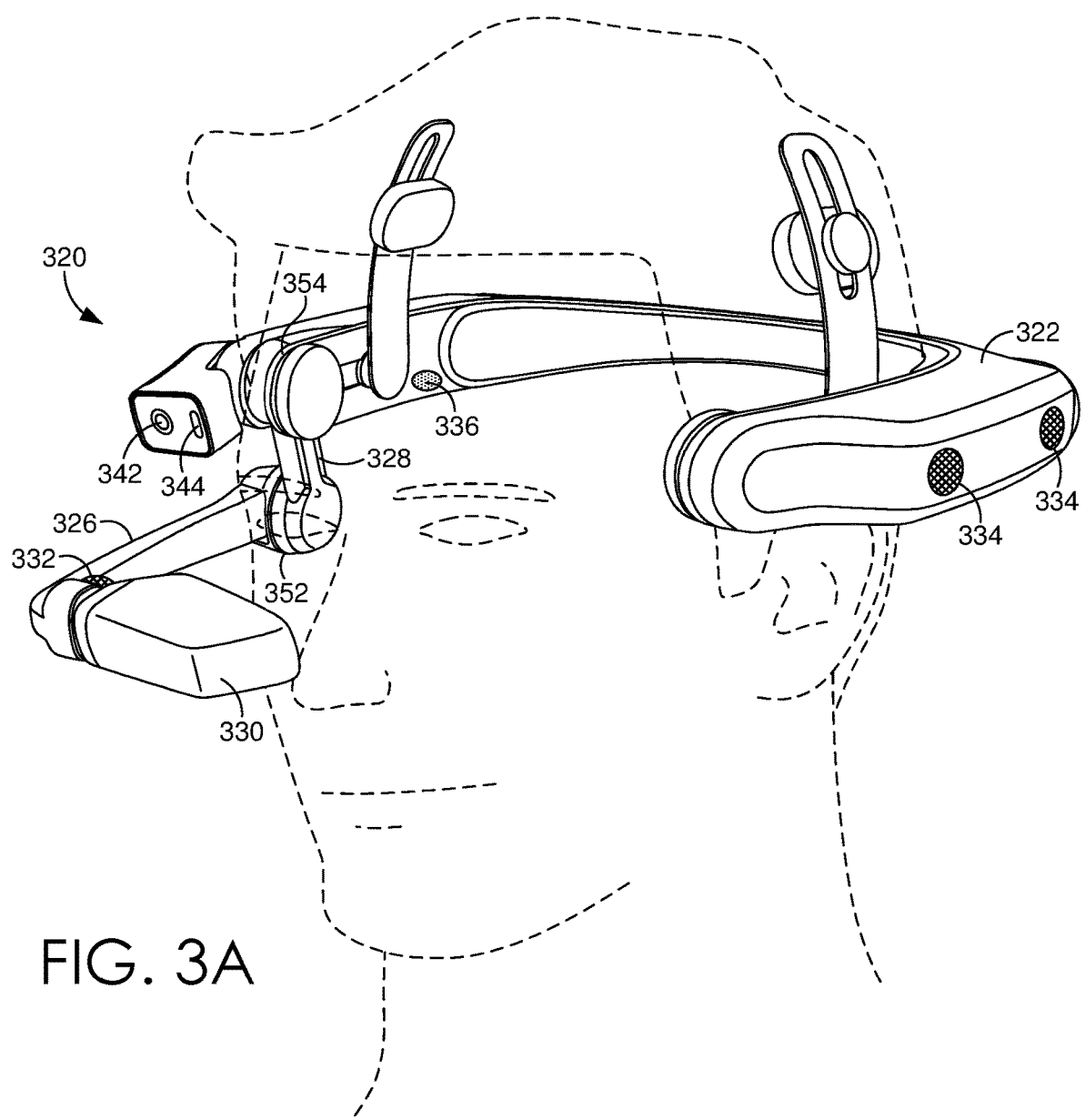
FIG. 3A shows an exemplary embodiment of a head-mounted display device, where the position of the display device is within the line-of-sight of the user.
Figure 3B:
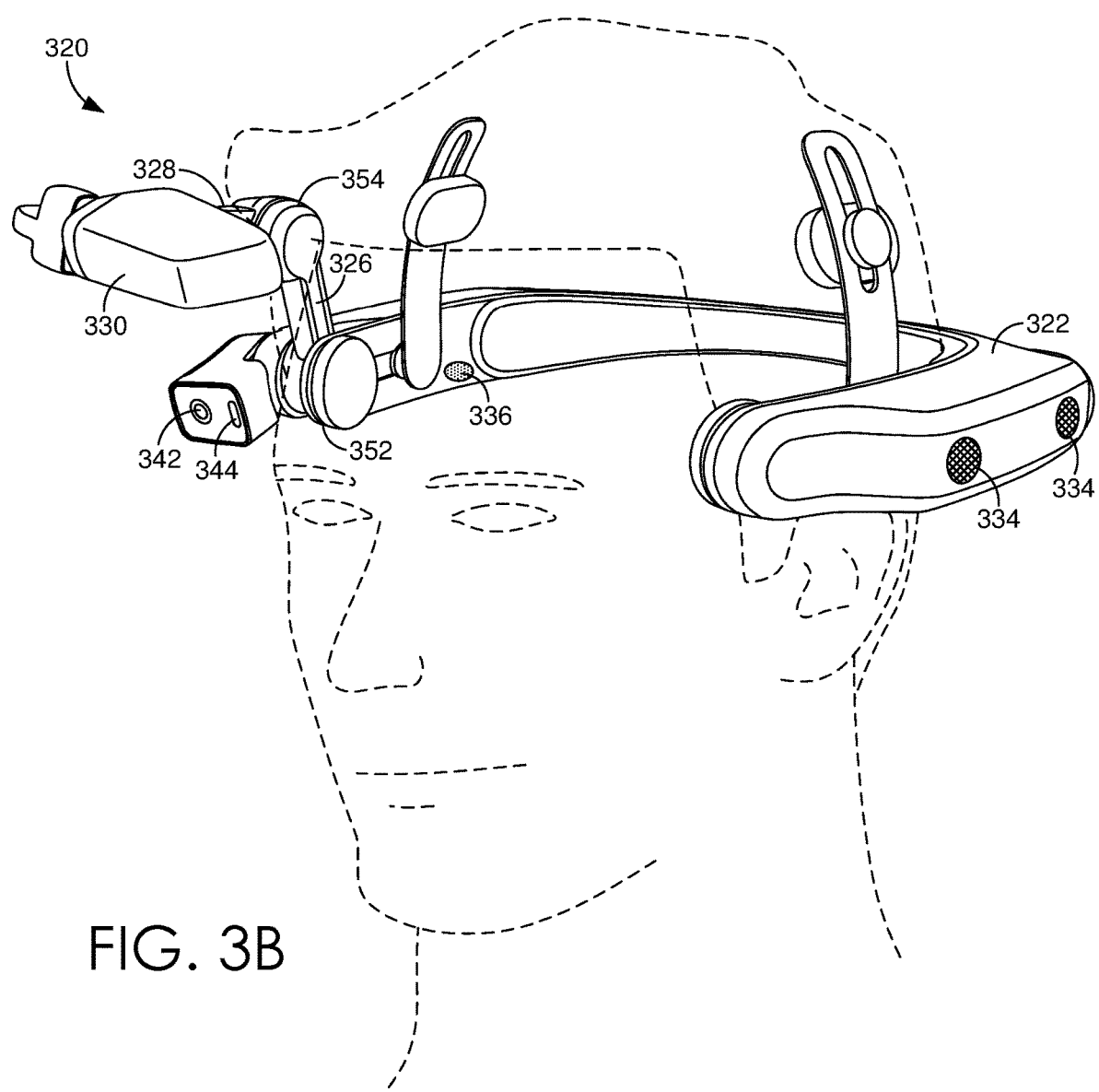
FIG. 3B shows the head-mounted display device of FIG. 3A, where the position of the display device is outside the line-of-sight of the user.

FIG. 3A shows an exemplary embodiment of a head-mounted display device 320, where the position of the display device is within the line-of-sight of the user. FIG. 3B shows the head-mounted display device 320 of FIG. 3A, where the position of the display device is outside the line-of-sight of the user. HMD device 320 may be similar to HMD device 220 of FIG. 2 and/or HMD device 120 of FIG. 1, and thus includes a display device. In the various embodiments, when the display device is positioned such that as shown in FIG. 3A, HMD device 320 is operated in a first operational mode (i.e. a visual mode). When the display device is positioned outside of the user's line-of-sight (LOS) (such as that shown in FIG. 3B), HMD device 320 is operated in a second operational mode (i.e. an audible mode.)

HMD device 320 includes frame member 322, first rotating member 226, and second rotating member 328. HMD device 320 includes primary microphone 332 and multiple auxiliary microphones 334, as well as one or more audio speakers 336. Furthermore, HMD device 320 includes one or more cameras 342 and one or more photon-emitters 344. Camera 342 may be a photon-detector. Display module 330 houses the display device that is directed towards the eyes of the users and is occluded in FIGS. 3A-3B. Various embodiments of the user's view of the display device (when the display device is within the user's LOS) are shown in FIGS. 4A, 5A, 6A, 7A, and 8A.

As noted above, FIG. 3A shows that display module 330 may be positioned such that the display device is within the line-of-sight (LOS) of the user. A comparison of FIG. 3B with FIG. 3A shows that at least one of first rotating member 326 and/or second rotating member 328 can be rotated, relative to frame member 322, such that the display device is outside of (or excluded from) the LOS of the user. More particularly, second rotating member 328 is rotatably coupled to frame member 322 via a first rotational joint 354 and first rotating member 326 is rotatably coupled to second rotating member 328 via a second rotational joint 352.

Thus, by varying at least one or a first rotational orientation between the frame member 322 and the second rotating member 328 and/or a second rotational orientation between the second rotating member 328 and the first rotating member 226, a user may rotate the position of the display axis about an axis relative to their head.

More particularly, by rotating the position of the display (about the axis relative to their head), the user may selectively position the display module 330 such that the display device is within their LOS. Similarly, the user may selectively position the display module 330 such that the display device is outside of (or excluded from) from their LOS by varying the first rotational orientation between the frame member 322 and the second rotating member 328 and/or the second rotational orientation between the second rotating member 328 and the first rotating member 226. Note that by varying the first rotational orientation, a first angle between the frame member 322 and the second rotating member 328 is varied. Similarly, varying the second rotational orientation generates a variance in a second angle between the second rotating member 328 and the first rotating member 326. Further note that by varying at least one of the first or the second angle generates a variance in an angle between the display device and the frame member 322.

Whether the display device is within or outside the LOS of the user may be determined based on at least one of a first angle (i.e. the angle between frame member 322 and second rotating member 328), the second angle (i.e. the angle between second rotating member 328 and first rotating member 326), and/or the lengths of first/second rotating members 326/328. In various embodiments, one or more position-detecting sensors and/or switched are included in first rotational joint 354 to automatically detect and/or determine the first angle. Similarly, one or more position-detecting sensors and/or switches may be included in second rotational joint to automatically determine the second angle. Such sensors and/or switches may include, but are not otherwise limited to Hall Effect sensors and/or Hall Effect switches. Other such sensors and/or switches may also include, but are not limited to, optical sensors that detect optical encodings, mechanical switches, capacitive sensors, conductive switches, magnetic switches, and the like. That is, any position-detecting sensor and/or switch may be employed to determine whether the display device is within the user's LOS. More specifically, signals generated by such sensors and/or switches may be employed to detect the position of display device relative to the user's LOS. According whether the display device is within or excluded from the user's LOS may be automatically determined based on one or more signals generated by sensors and/or switches that are employed to detect a relative rotation and/or an angle between multiple members of a wearable device, such as but not limited to HMD device 320.

HMD device 320, as shown in FIGS. 3A-3B, is a non-limiting embodiment, and transitioning and/or repositioning a display device within and out of the user's LOS may be accomplished via configurations other than relative rotations and/or rotational orientations of frame member 322, first rotating member 326, and second rotating member 328. Note that first and second rotating members 326/328 may comprise a rotatable boom arm for supporting the display module 330. Thus, the boom arm may be articulated within and out of the user's LOS.

Furthermore, other methods for determining when the display device is within and outside of the user's LOS may be employed for other configurations other than relative rotations between members. For instance, relative translations between members supporting the display device may be sensed and/or detected. When the display device is transitioned from within the user's LOS to outside the user's LOS, the operational mode of HMD device 320 is transitioned from a visual mode to an audible mode. Similarly, when the display device is transitioned fro outside the user's LOS to within the user's LOS, the operational mode of HMD device 320 is transitioned from the audible mode to the visual mode.

In at least one embodiment, the user may select the transition of the operational mode, via verbally speaking voice-activated commands, such as but not limited to "visual mode," "audible mode," and the like. Such voice activated commands may be detected via electroacoustic transducers, such as but not limited primary microphone 332 and/or auxiliary microphones 334. In some embodiments, a first subset of the set available microphones may be operated when HMD device 320 is operated in the visual mode. A second subset of the set available microphones may be operated when HMD device 320 is operated in the audible mode. In some embodiments, the intersection of the two subsets of the set of available microphones is the empty set. In other embodiments, the intersection of the two subsets of available microphones includes one or more microphones.

For example, during operation in the visual mode, in some embodiments, only the primary microphone 332 is operated and/or activated. Because rotation of the boom arm (first/second rotating members 326/328) may displace primary microphone 332 away from the user's mouth, at least a portion of the auxiliary microphones 334 may be operated and/or activated during audible mode. In some embodiments, primary microphone 332 may be continued to be operated and/or activated during audible mode. In other embodiments, primary microphone may not be operated during audible mode.

As noted above and in general, a visual mode is an operational mode of a wearable device that provides visual-based presentations of UIs, content, information, data, and the like, via the display device included in the wearable device. Such visual-based presentations include various visual elements, visual indications, and/or visual content that enable the user to receive information, control the wearable device, and access capabilities of the wearable device through interactions with the visual-based presentations of one or more UIs.

In contrast to a visual mode, an audible mode is an operational mode of a wearable device that provides audio-based presentations of UIs, content, information, data, and the like, via one or more audible speakers included in the wearable device. Such audio-based presentations include spoken-word, audible elements, audible indications, and/or audible content that enable the user to receive information, control the wearable device, and access capabilities of the wearable device through interactions with the audio-based presentations of UIs. Furthermore, interaction with visual-based and/or audio-based presentations of UIs may be at least partially speech-driven. That is, the user may control the wearable device (in either audible and/or visual mode) herein and access various capabilities of the wearable device via verbally speaking voice-activated commands that are detected by one or more other electroacoustic transducers (e.g. a microphone) included in the wearable device.

Figure 4A:
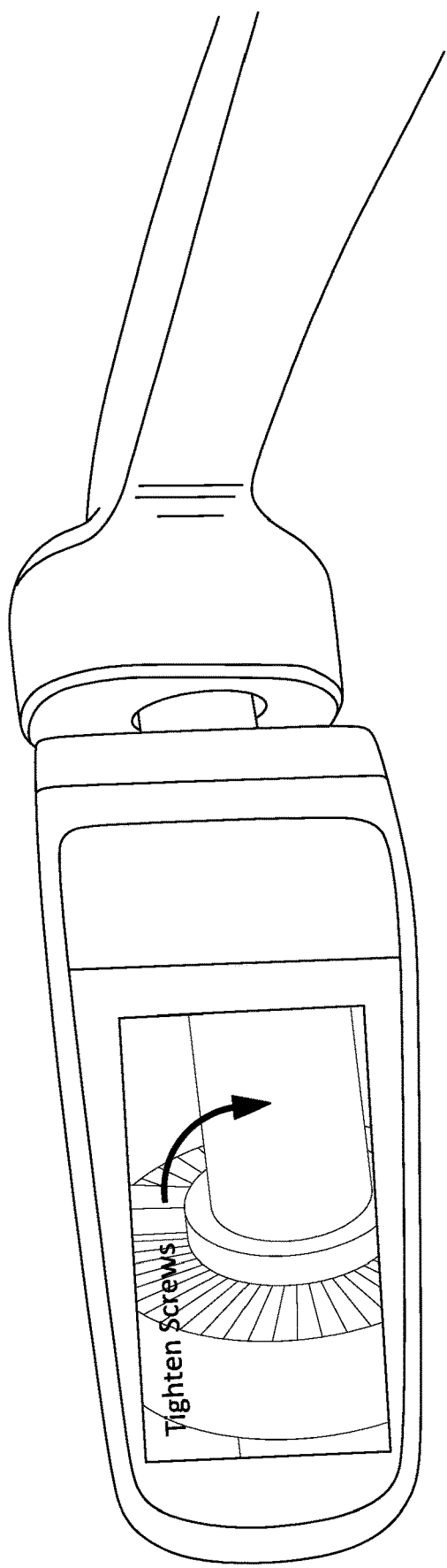
FIG. 4A provides a schematic diagram showing operations of an exemplary embodiment of a visual mode of a head-mounted display device, in accordance with some implementations of the present disclosure.

FIG. 4A provides a schematic diagram showing operations of an exemplary embodiment of a visual mode of a head-mounted display device, in accordance with some implementations of the present disclosure. The HMD device may be similar to HMD device 320 of FIGS. 3A-3B, HMD device 220 of FIG. 2, and/or HMD device 120 of FIG. 1. Hashed boundary 400 schematically demarcates the user's LOS. Similar to the positioning of the display module 330 of HMD device 320 of FIG. 3A, display module 430 (and the display device 460) of FIG. 4A are within the user's LOS. First rotating member 426 supports the display module 430. The primary microphone 436 is located near the distal end of first rotating member 426.

In FIG. 4A, the user of the HMD device is being provided, via display device 460, visual presentations of content, such as but not limited to a video presentation 470 of maintaining a jetliner engine. Visual presentations of other content may be superimposed, combined, blended, layers, and/or composited with video presentation 470. For instance, visual elements such as text box 473 and directional arrow 474 are superimposed over video presentation 470 displayed on display device 460. Each of the superimposed visual elements (i.e. text box 472 and directional arrow 474) provide a visual indication of a notification to the user, i.e. a notification that notifies the user which screws to tighten and a direction which to tighten then. A user of a remote computing device, such as but not limited to any of user computing devices 102-108 of FIG. 1, may be providing the video presentation 470 and/or any of the telestrations, such as but not limited to visual elements text box 472 and directional arrow 474.

Figure 4B:
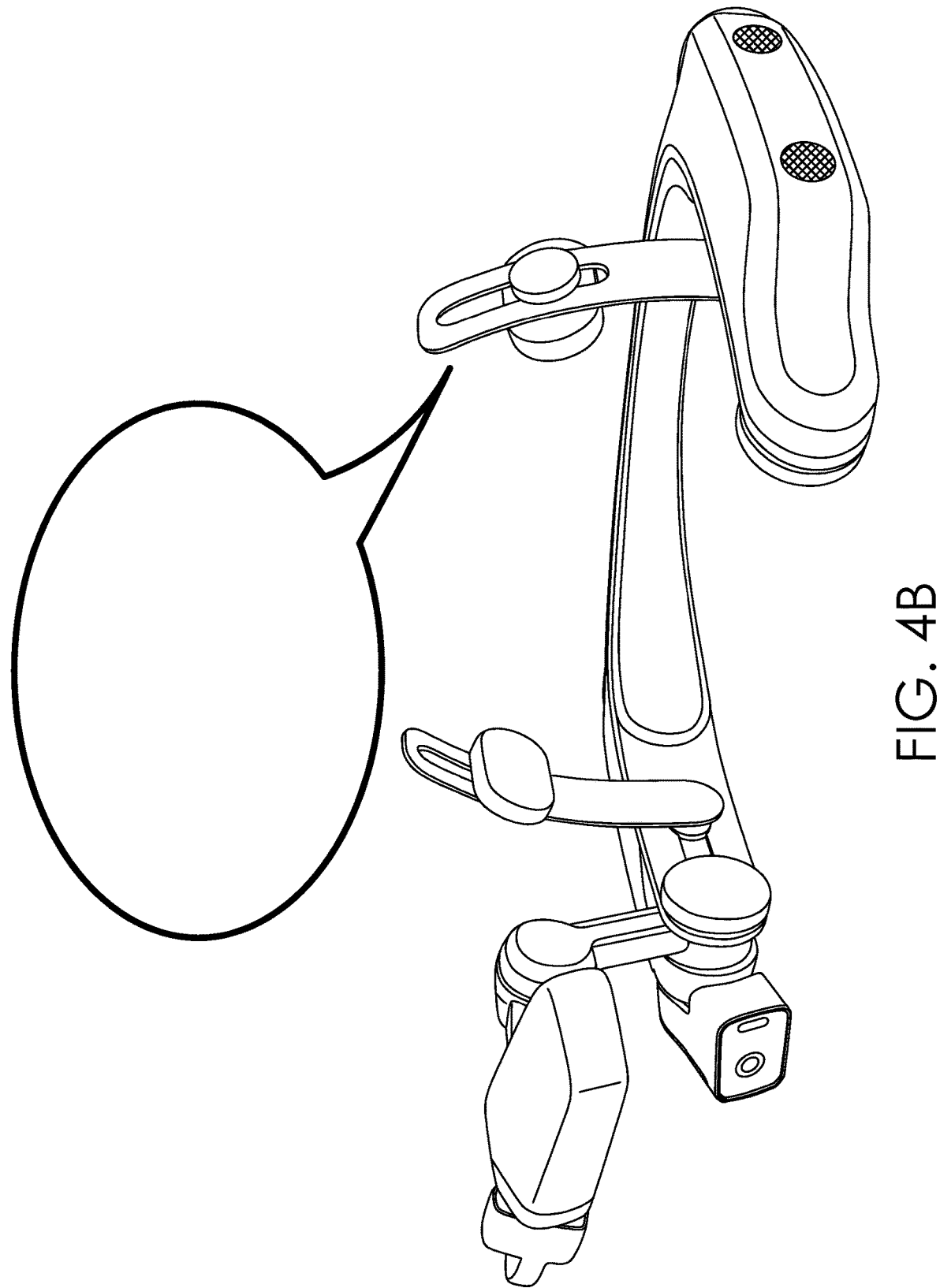
FIG. 4B provides a schematic diagram showing operations of an exemplary embodiment of an audible mode of a head-mounted display device, in accordance with some implementations of the present disclosure.

FIG. 4B provides a schematic diagram showing operations of an exemplary embodiment of an audible mode of a head-mounted display device 420, in accordance with some implementations of the present disclosure. HMD device 420 may be similar to HMD device 320 of FIGS. 3A-3B, HMD device 220 of FIG. 2, and/or HMD device 120 of FIG. 1. Hashed boundary 400 schematically demarcates the user's LOS. Similar to the positioning of the display device of HMD device 320 of FIG. 3B, the display device of HMD device 420 is outside of the user's LOS.

In FIG. 4B, the user of HMD device 420 is being provided, via an audible speaker of HMD device 420, audible presentations of at least a portion of the content provided to the user associated with FIG. 4A. More specifically, as shown via the comment bubble, an audible voice provides an audible indication of at least a portion of the notification shown in FIG. 4A. The voice may be a computer-generated voice, i.e. the verbal notification may be computer generated speech. The generation of the speech may be based on the notification to provide the user.

For instance, HMD device 420 may receive an instruction or a request to provide content, such as but not limited to a notification, to the user of the HMD device 420. The notification may include a visual element, such as but not limited to text box 472 and/or directional arrow 474 of FIG. 4A. In various embodiments, the instruction may be received from a remote user of a remote computing device, such as one or user computing devices 102-108 of FIG. 1. When HMD device 420 is operated in an audible mode, an audible indication of the visual element may be determined, either by HMD device 420 or another computing device. FIG. 4B demonstrates the audible indication of the visual element, being proved to the user via audible words.

In various embodiments, the instruction may include a feature of the content. Some features of content may be associated with a visual-only condition. For instance, notifications that are not easily provided via audible means or notifications and/or warnings of critical importance may be associated with a visual-only condition. Some visual-only conditions associated with features of content may include, but are not limited to, the display of one or more of geographical maps, instructional videos, graphical symbols and/or icons, a virtual object, an avatar of another user, or the like. HMD device 420 may determine the feature included in the received instruction. If the HMD device is being operated in the audible mode and the determined feature is associated with a visual-only condition, an audible indication (indicating the visual-only condition) may be provided to the user, via an audible speaker of the HMD device.

For instance, computer-generated speech may provide a warning or a request for the user to re-position the display device within their LOS. That is, a voice that is automatically generated by the HMD device may instruct the user to "Please lower the display unit," or some other message that includes a similar sentiment. In response to detecting and/or determining that the user has repositioned the display device within their LOS, the HMD device may automatically be transitioned to the visual mode of operation. The content may then be visually provided to the user via the display device. In some embodiments, the feature of the content may be associated with a visual-optional condition. Accordingly, when the HMD device is being operated in the audible mode, the audible indications of the content may be determined and provided to the user, via the audible speakers of the HMD device.

Figure 5A:
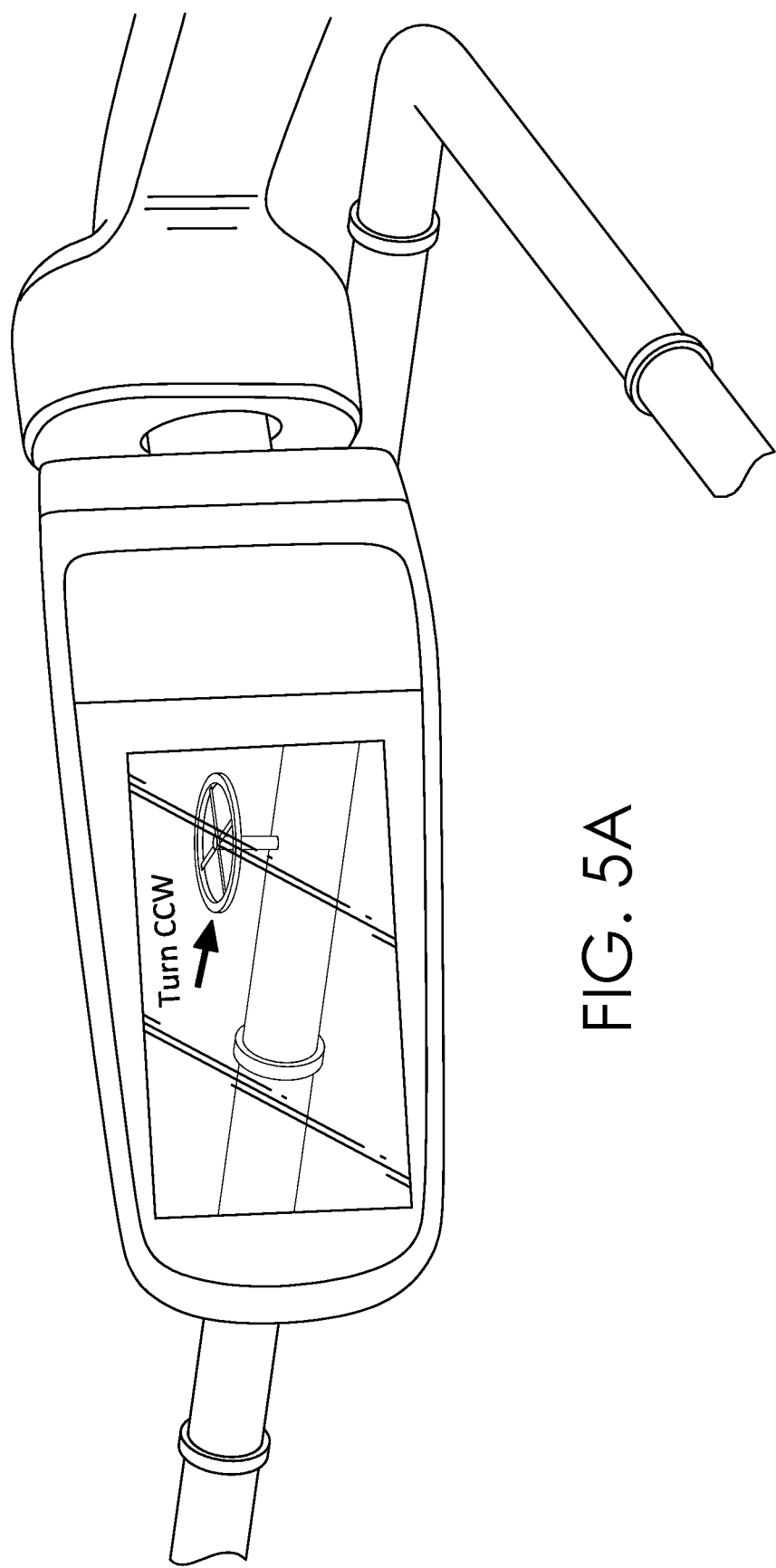
FIG. 5A provides a schematic diagram showing operations of an exemplary embodiment of a visual mode of a head-mounted display device, in accordance with some implementations of the present disclosure.

FIG. 5A provides a schematic diagram showing operations of an exemplary embodiment of a visual mode of a head-mounted display device, in accordance with some implementations of the present disclosure. Similar to FIG. 4A, hashed boundary 400 schematically demarcates the user's LOS. In FIG. 5A, a photon-detector of the HMD device may generate image data of the FOV of the photon-detector. The FOV of the photon-detector may be similar to the LOS or the FOV of the user. As shown in FIG. 5A, the image data be displayed by the display device 560.

In addition to being displayed via displayed device 560, the image data may be provided to a remote user of a remote computing device, such as user computing devices 102-108 of FIG. 1. The remote computing device may provide visual elements (e.g. telestrations) of a notification or a warning. An instruction to provide the notification to the user may be received, from the remote computing device, at the HMD device. When being operated in the visual mode, the visual elements and/or visual indications of the notification may be provided to the user by superimposing and/or compositing the visual indications over the image data displayed on display device 560. For instance, display device 560 is shown displaying text box 572 and indication arrow 574.

Figure 5B:
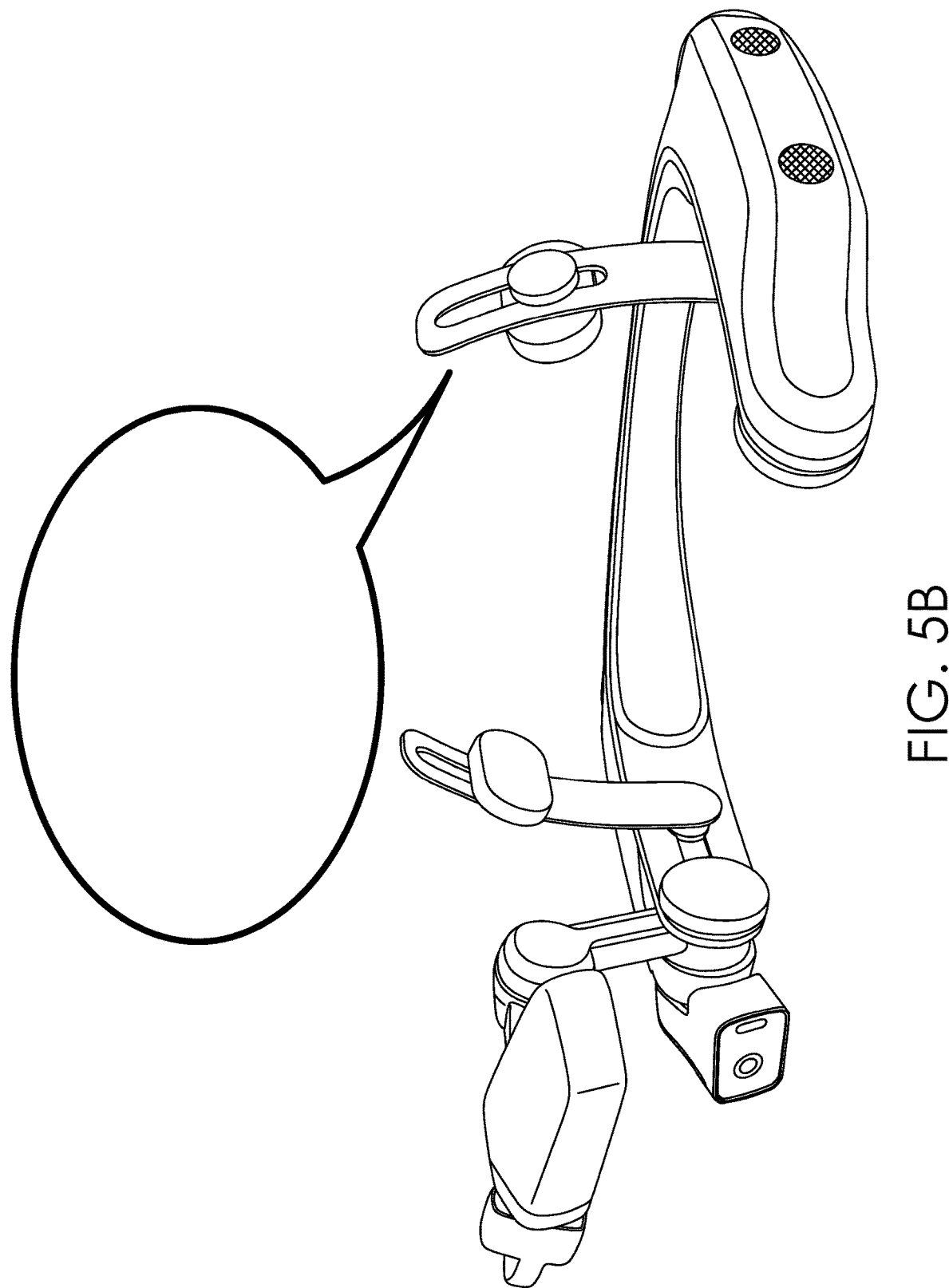
FIG. 5B provides a schematic diagram showing operations of an exemplary embodiment of an audible mode of an augmented-reality enabled head-mounted display device, in accordance with some implementations of the present disclosure.

FIG. 5B provides a schematic diagram showing operations of an exemplary embodiment of an audible mode of a head-mounted display device 520, in accordance with some implementations of the present disclosure. Similar to HMD device 420 of FIG. 4B, HMD device 520 is shown providing an audible indication of the visual elements (text box 572 and indication arrow 574) of FIG. 5A.

Figure 6A:
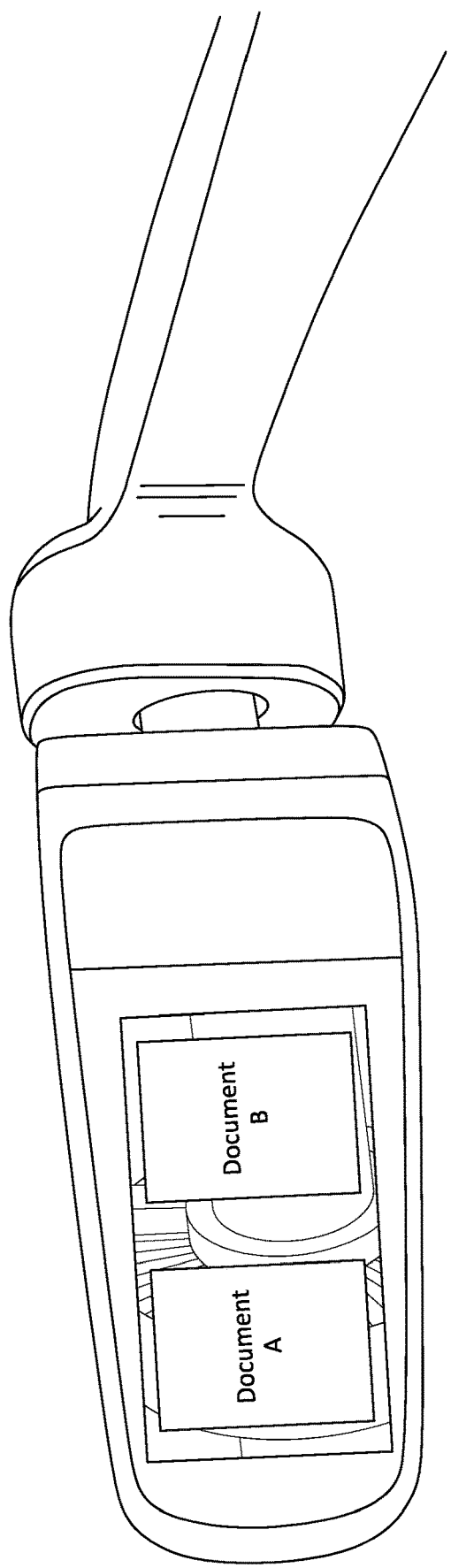
FIG. 6A provides a schematic diagram showing operations of an exemplary embodiment of a visual mode of a head-mounted display device, in accordance with some implementations of the present disclosure.

FIG. 6A provides a schematic diagram showing operations of an exemplary embodiment of a visual mode of a head-mounted display device, in accordance with some implementations of the present disclosure. More particularly, display device 660 is shown superimposing visual indications for multiple user-options over visual content and/or image data. In FIG. 6A, an icon associated with "Document A" (first icon 672) and an icon associated with "Document B" (second icon 674) are visual indications of user-options. That is, a user may select either "Document A" (a first user-option) or "Document B" (a second user-option) for display on display device 660. The user may select from the user-options by verbalizing their choice. The HMD device may receive such audible indications of the user selection via one or more microphones included in the HMD device.

Figure 6B:
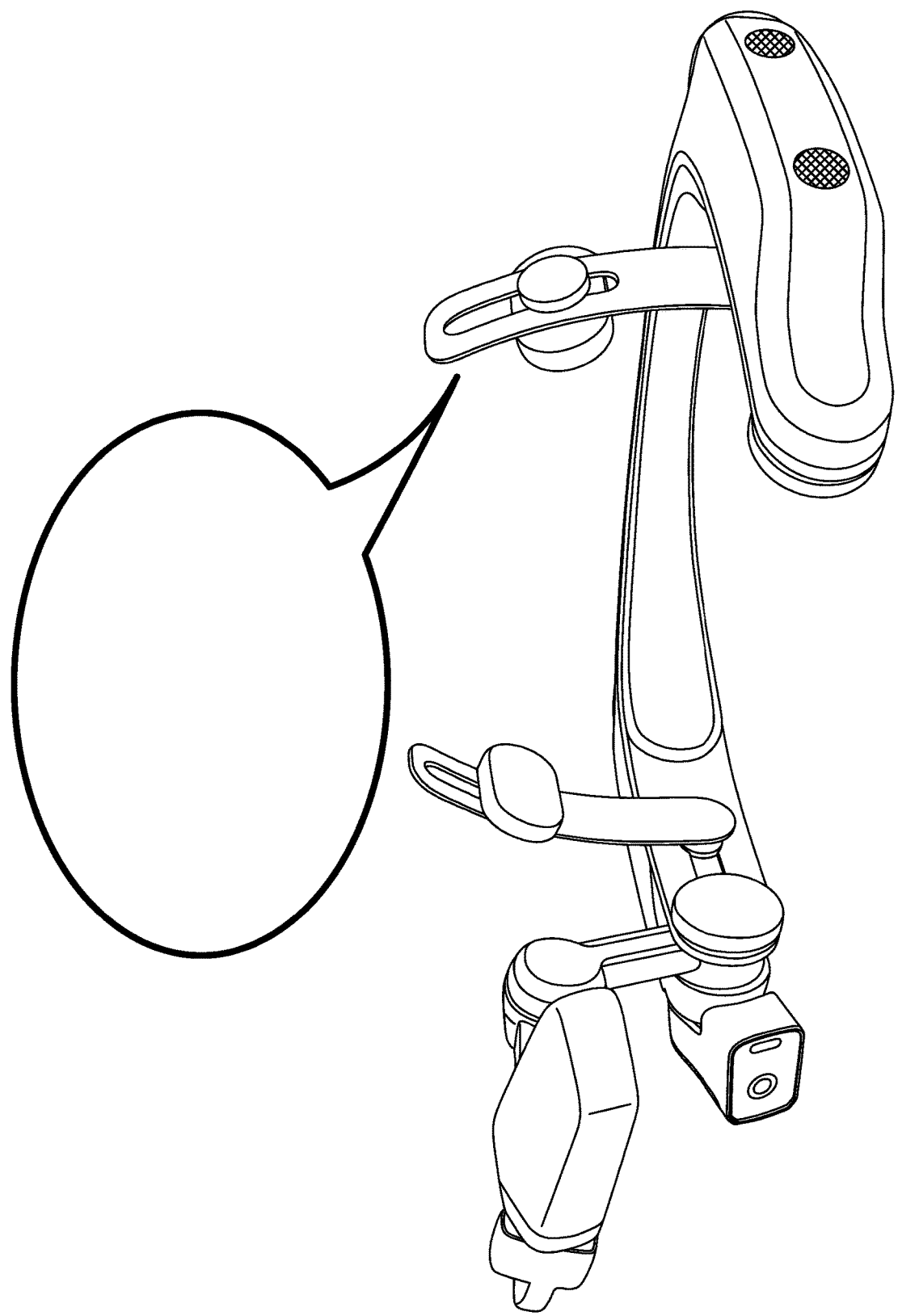
FIG. 6B provides a schematic diagram showing operations of an exemplary embodiment of an audible mode of a head-mounted display device, in accordance with some implementations of the present disclosure.

FIG. 6B provides a schematic diagram showing operations of an exemplary embodiment of an audible mode of a head-mounted display device 620, in accordance with some implementations of the present disclosure. Similar to HMD device 420 of FIG. 4B and/or HMD device 520 of FIG. 5B, HMD device 620 is shown providing an audible indication of a first user-option (Document A) and an audible indication of a second user-option (Document B). In at least one embodiment, when operating in the audio mode, the user may indicate their selection of user-options via selection components included in HMD device 620, such as but not limited to selection buttons 622/624/626. Upon select of one of Document A or Document B, further selected portions of text, information, or data included in the selected document may be narrated to the user by employing text-to-speech services.

Figure 7A:
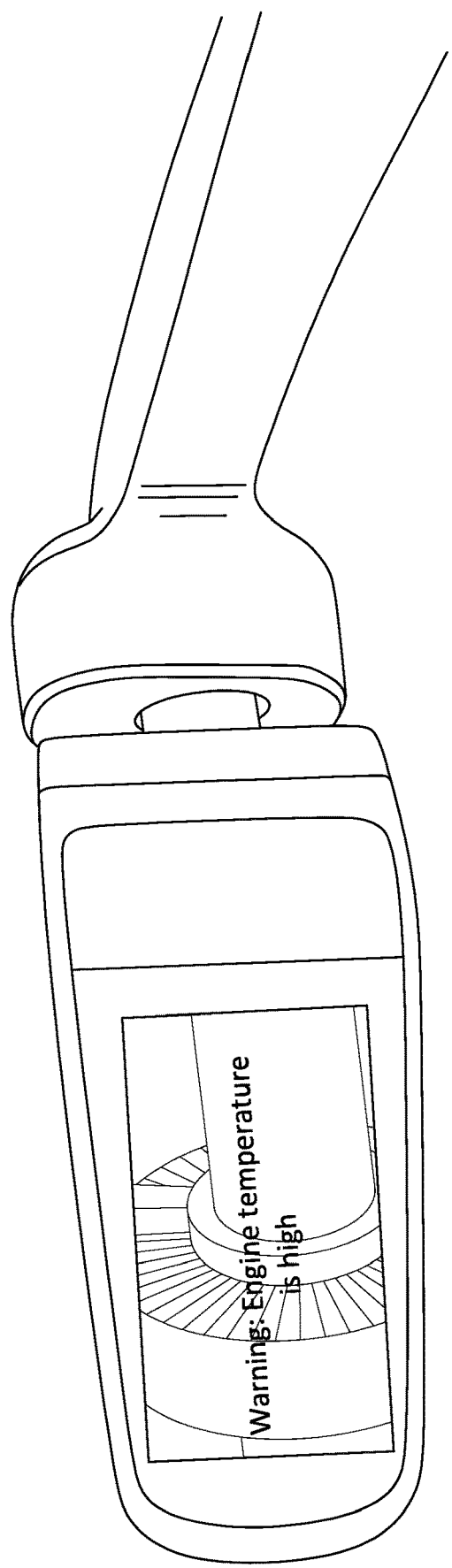
FIG. 7A provides a schematic diagram showing operations of an exemplary embodiment of a visual mode of a head-mounted display device, in accordance with some implementations of the present disclosure.

FIG. 7A provides a schematic diagram showing operations of an exemplary embodiment of a visual mode of a head-mounted display device, in accordance with some implementations of the present disclosure. Display device 760 is providing a visual indication 772 of a warning. For instance, an instruction may be received, from another device that is actively monitoring the temperature of the jetliner engine display via display device 760.

Figure 7B:
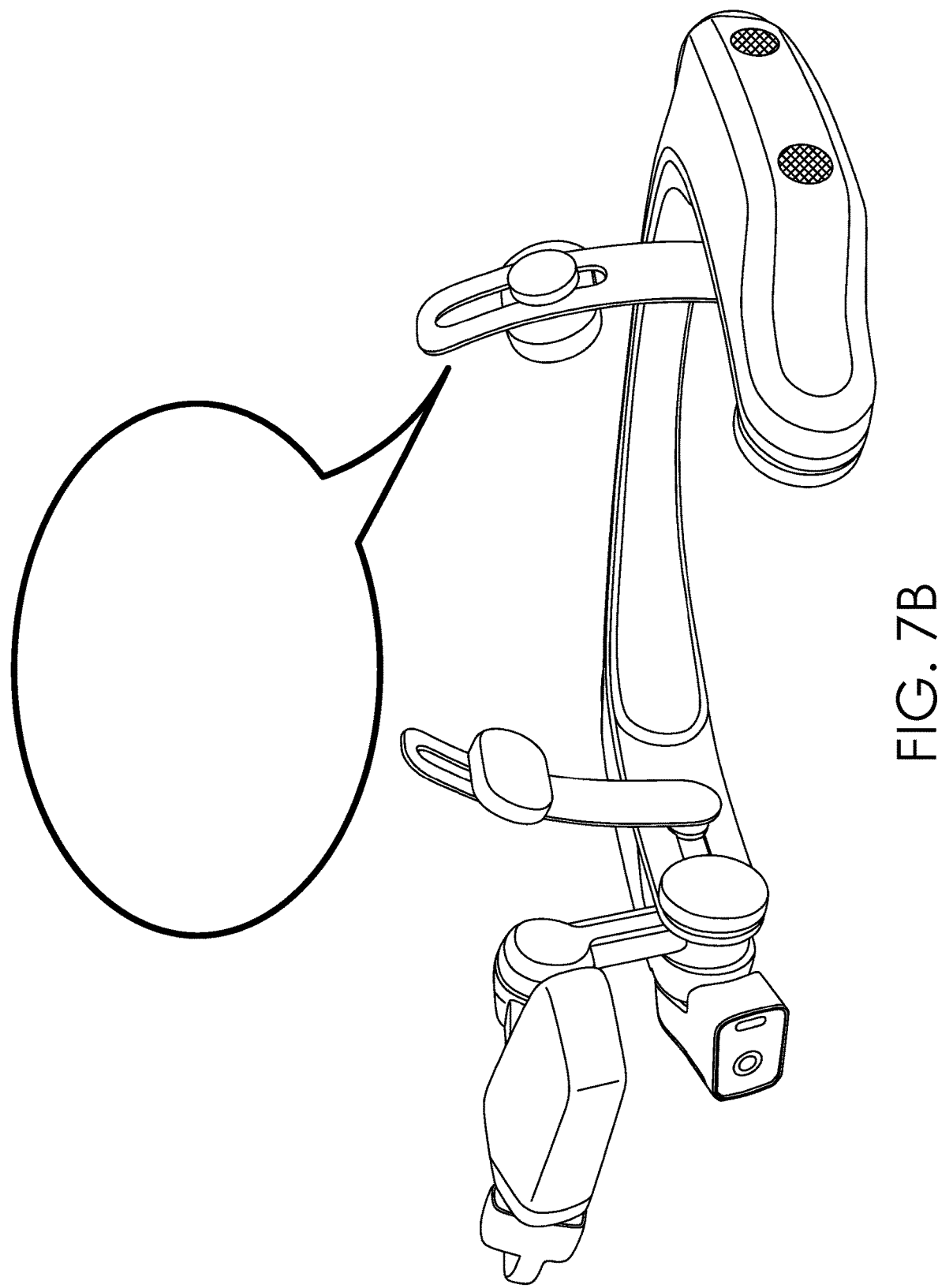
FIG. 7B provides a schematic diagram showing operations of an exemplary embodiment of an audible mode of a head-mounted display device, in accordance with some implementations of the present disclosure.

FIG. 7B provides a schematic diagram showing operations of an exemplary embodiment of an audible mode of a head-mounted display device 720, in accordance with some implementations of the present disclosure. Similar to HMD device 420 of FIG. 4B, HMD device 520 of FIG. 5B, and/or HMD device 620 of FIG. 6B, HMD device 720 is shown providing an audible indication of the warning visually indicated in display device 760 of FIG. 7A.

In at least some embodiments, a criticality or importance may be determined by HMD device 720. The computer-generated speech providing the audible indication of the warning may be selectively audibly emphasized to reflect the determined criticality and/or importance. In at least some embodiments, a volume and/or a frequency of repeating the audible indication may be based on the criticality and/or importance.

Figure 8A:
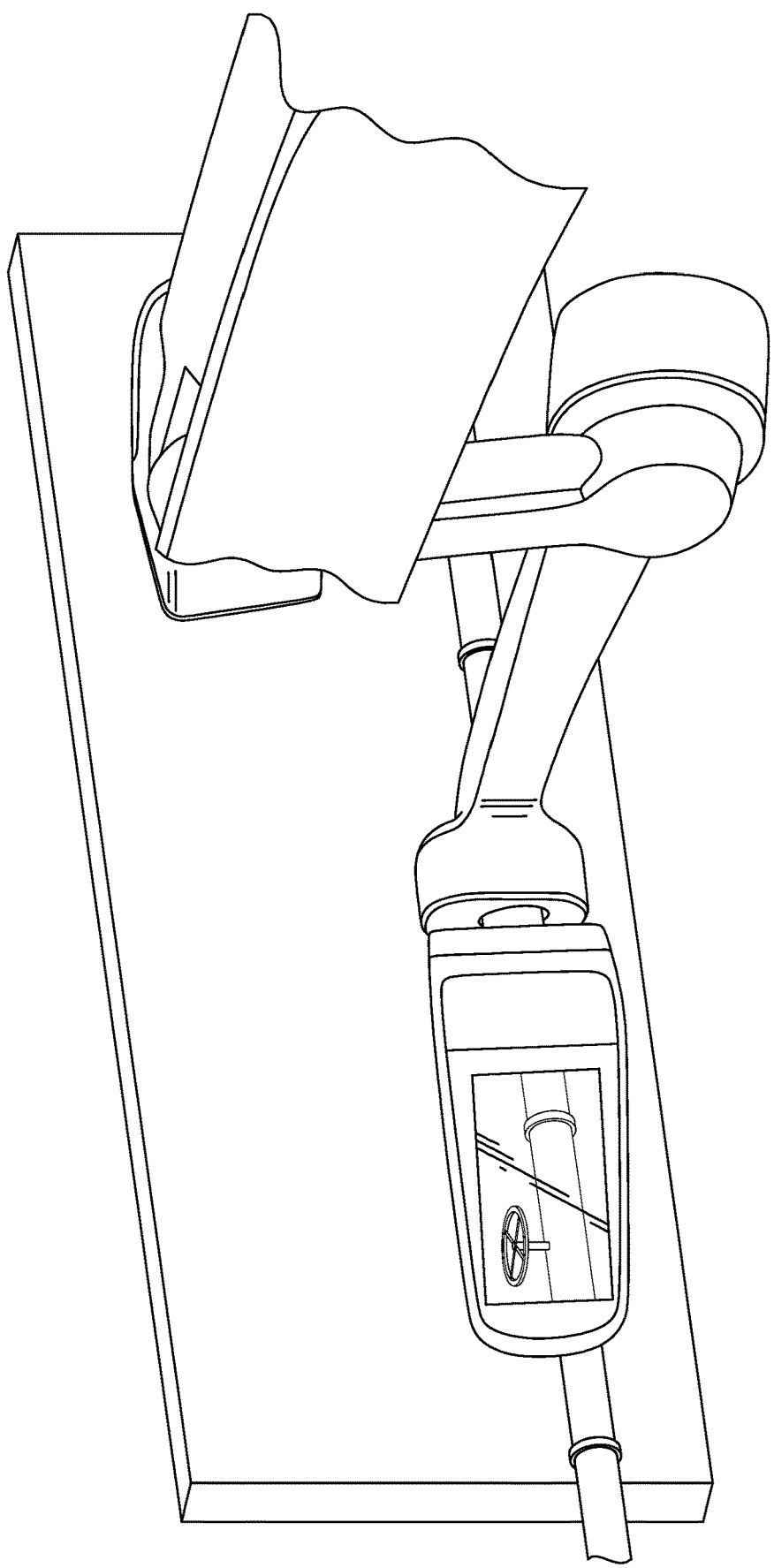
FIG. 8A provides a schematic diagram showing operations of an exemplary embodiment of a visual mode of an augmented-reality enabled head-mounted display device, in accordance with some implementations of the present disclosure.

FIG. 8A provides a schematic diagram showing operations of an exemplary embodiment of a visual mode of an augmented-reality enabled head-mounted display device, in accordance with some implementations of the present disclosure. That is, any of the various HMD devices discussed herein may be augmented-reality (AR) and/or mixed-reality (MR) enabled devices. As such, display device is at least partially optically transparent and the user may view their environment through display device 860. Furthermore, display device 860 may superimpose visual elements and/or visual indications (such as but not limited to text box 872) on the portion of the user's environment viewed through display device 860.

The HMD device may include a photon-detector 842 and a photon-emitter 844 (each of which are occluded in the view of FIG. 8A). As discussed in conjunction with at least FIG. 5A, image data captured and/or generated by photon-detector 842 of photon-detector's FOV may be provided to a remote computing device.

FIG. 8B provides a schematic diagram showing operations of an exemplary embodiment of an audible mode of an augmented-reality enabled head-mounted display device, in accordance with some implementations of the present disclosure. Photon-emitter 844 may be employed to provide laser-based and/or LED-based telestrations on surfaces of the user's environment. For instance, in audible mode, when the notifications, warnings, and the like are not provided via display device 860, photon-emitter 844 may be employed to project such visual elements onto surfaces of the user's environment. For instance, as shown in FIG. 8B, photon emitter is employed to project a visual indication 882 of text box 872 of FIG. 8A on the corresponding surfaces of the user's environment.

Photon-emitter 844 is additionally employed to project (onto surfaces of the user's environment) a visual indication (i.e. bounding box 884) of the boundary of the FOV of photon-detector 842. The projection of bounding box 884 provides the user a visual indication of the image data generated and/or captured via photon-detector 842. For instance, it may be beneficial for the user of the HMD device to simultaneously view image data they are transmitting to a remote user. When in a visual mode, the user may view such image data via display device 860 (as discussed in conjunction with at least FIG. 5A). Projected bounding box 884 informs the user of the FOV of the photon-detector that is employed to capture image data for the viewing of such a remote user.

In various embodiments, a remote user may initiate the change or transition in the operational mode of the HMD device. That is, a remote computing device may process a change and/or a transition in the operational mode of the HMD device, in response to a command and/or instruction initiated by the remote user. In one such embodiment, the remote user of one of remote computing devices 102-108 of FIG. 1 may disable the visual mode of the HMD device and enable the audible mode. For example, an administrative user can employ desktop 104 to provide a command and/or instruction to the HMD device that transitions the HMD device from the visual mode to the audible mode (or vice-versa). At least one of an audible and/or a visual notification may be provided to the user of the HMD device to provide an indication to the user that the operational mode of the HMD device is being transitioned via a remote user and/or a remote computing device.

Figure 8C:
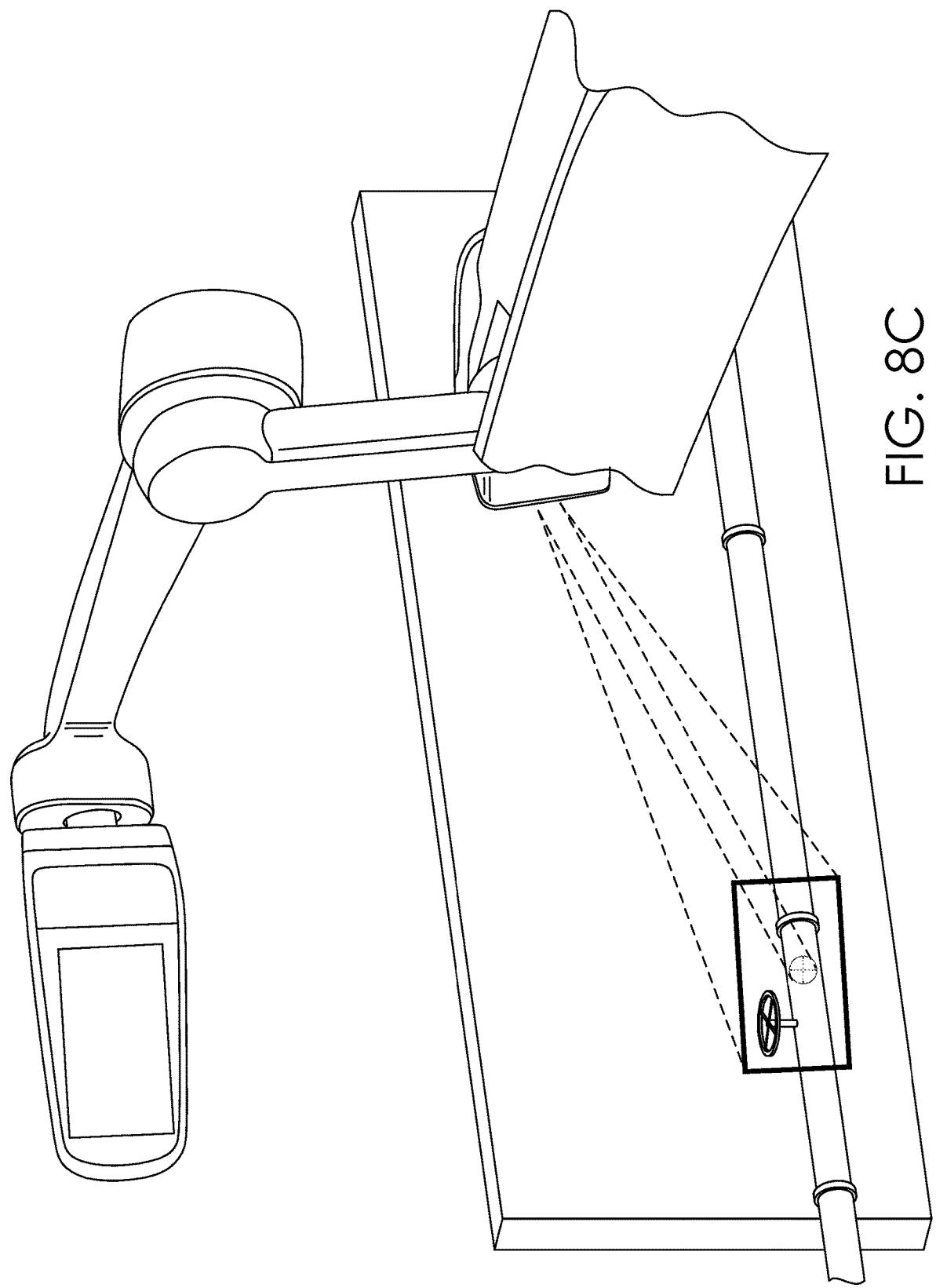
FIG. 8C provides a schematic diagram showing additional operations of an exemplary embodiment of an audible mode of an augmented-reality enabled head-mounted display device, in accordance with some implementations of the present disclosure.

FIG. 8C provides a schematic diagram showing additional operations of an exemplary embodiment of an audible mode of an augmented-reality enabled head-mounted display device, in accordance with some implementations of the present disclosure. In FIG. 8C, in addition to boundary box 884, photon-emitter is employed to project a visual indication of the center (e.g. bullseye 886) of the FOV of photon-detector 842. The visual indication of the center of the FOV of photon-detector may be virtually any indication, such as but not limited to a dot, a bullseye, a cursor, or some other indicator. The projection of a visual indication of the center of the FOV of photon-detector 842 provides the user further visual indication of the image data generated and/or captured via photon-detector 842.

Figure 9A:
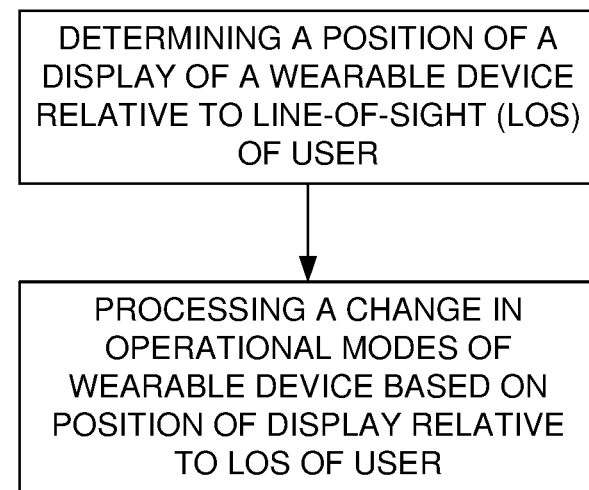
FIGS. 9A-9B provide illustrative process flows depicting a method for operating a wearable device, in accordance with some implementations of the present disclosure.
Figure 9B:
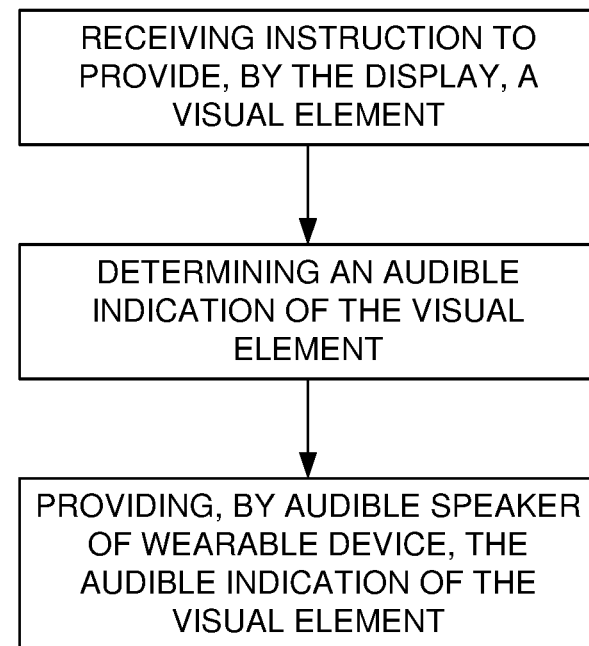

Having described various aspects of the present disclosure, exemplary methods are described below in for operating a wearable device. Referring to FIGS. 9A-9B in light of FIGS. 1-8C, FIGS. 9A-11B provide illustrative process flows depicting various methods for operating a wearable device, in accordance with some implementations of the present disclosure. Each block of below method (900, 920, 1000, 1100, and 1120) and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Process 900 of FIG. 9A begins at block 902. At block 902, a position of a display device (or simply a display) of a wearable device is determined (or detected). The position may be relative to the line-of-sight (LOS) of the user (i.e. a wearer of the wearable device). The wearable device may be a head-mounted display (HMD) device. At block 904, a change (or transition) in operational modes of the wearable device is processed. Processing the change may be based on the determined and/or detected position of the display device relation to the LOS of the user.

Process 920 of FIG. 9B begins at block 922. At block 922, an instruction to provide, by the display device, is received. The instruction may be received by the wearable device. At block 924, an audible indication of the visual element is determined. At block 926, the audible indication of the visual element is provided by an audible speaker of the wearable device.

Figure 10:
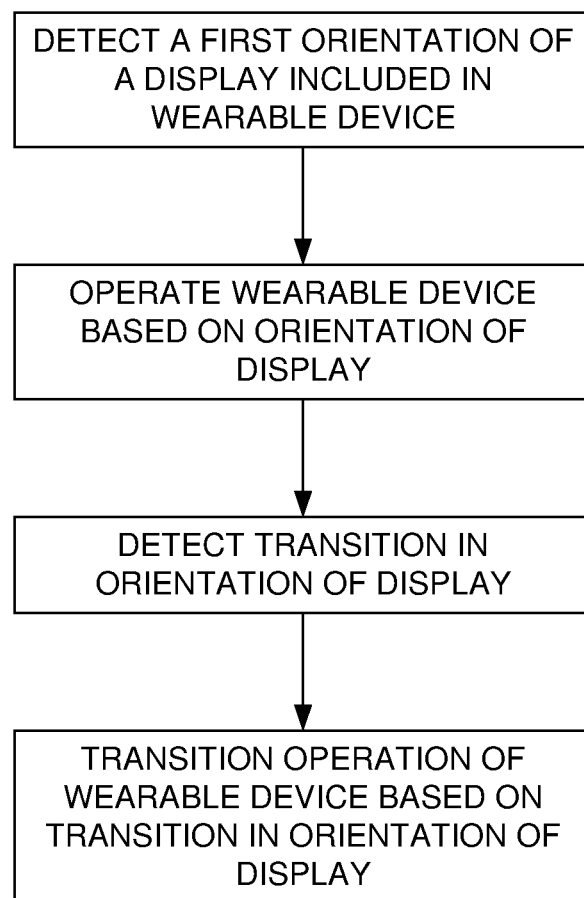
FIG. 10 provides an illustrative process flow depicting another method for operating a wearable device, in accordance with some implementations of the present disclosure.

Process 1000 of FIG. 10 begins at block 1002. At block 1002, a first orientation of a display device included in a wearable device is detected (or determined). At block 1004, the wearable device is operated in an operational model based on the detected orientation of the display device. At block 1006, a transition on the orientation of the display device is detected. At block 1008, the operation of the wearable device is transitioned (or processed) based on the transition in the orientation of the display device. For instance, the operational mode of the wearable device may be transitioned at block 1008.

Figure 11A:
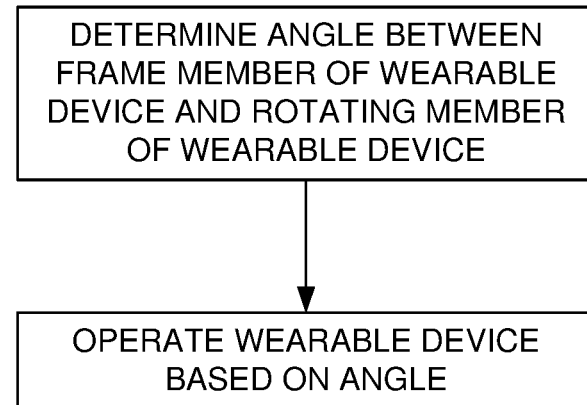
FIGS. 11A-11B provide illustrative process flows depicting still another method for operating a wearable device, in accordance with some implementations of the present disclosure.

Process 1100 of FIG. 11A begins at block 1102. At block 1102, an angle between a frame member of a wearable device and a rotating member of the wearable device is determined. At block 1104, the wearable device is operated based on the determined angle.

Figure 11B:
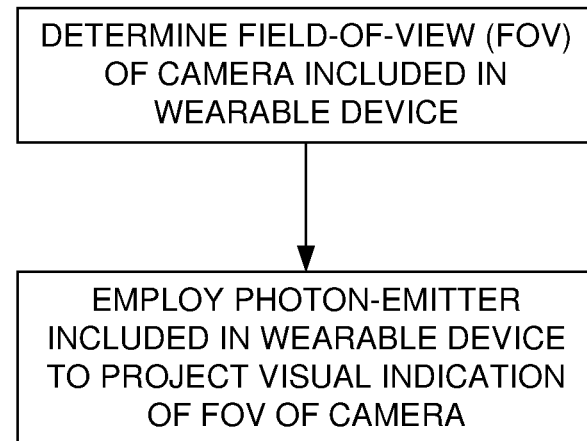

Process 1120 of FIG. 11B begins at block 1122. At block 1122, a field-of-view (FOV) of a camera included in the wearable device is determined. At block 1124, a photon-emitter included in the wearable device in employed to project a visual indication of the DOV of the camera. For instance, the photon-emitter may project a bounding box on surfaces of the user's environment that correspond to the boundary of the FOV or a bullseye on a surface that corresponds to a center of the FOV.

Having described embodiments of the present invention, an example operating environment in which embodiments of the present invention may be implemented is described below in order to provide a general context for various aspects of the present invention.

Figure 12:
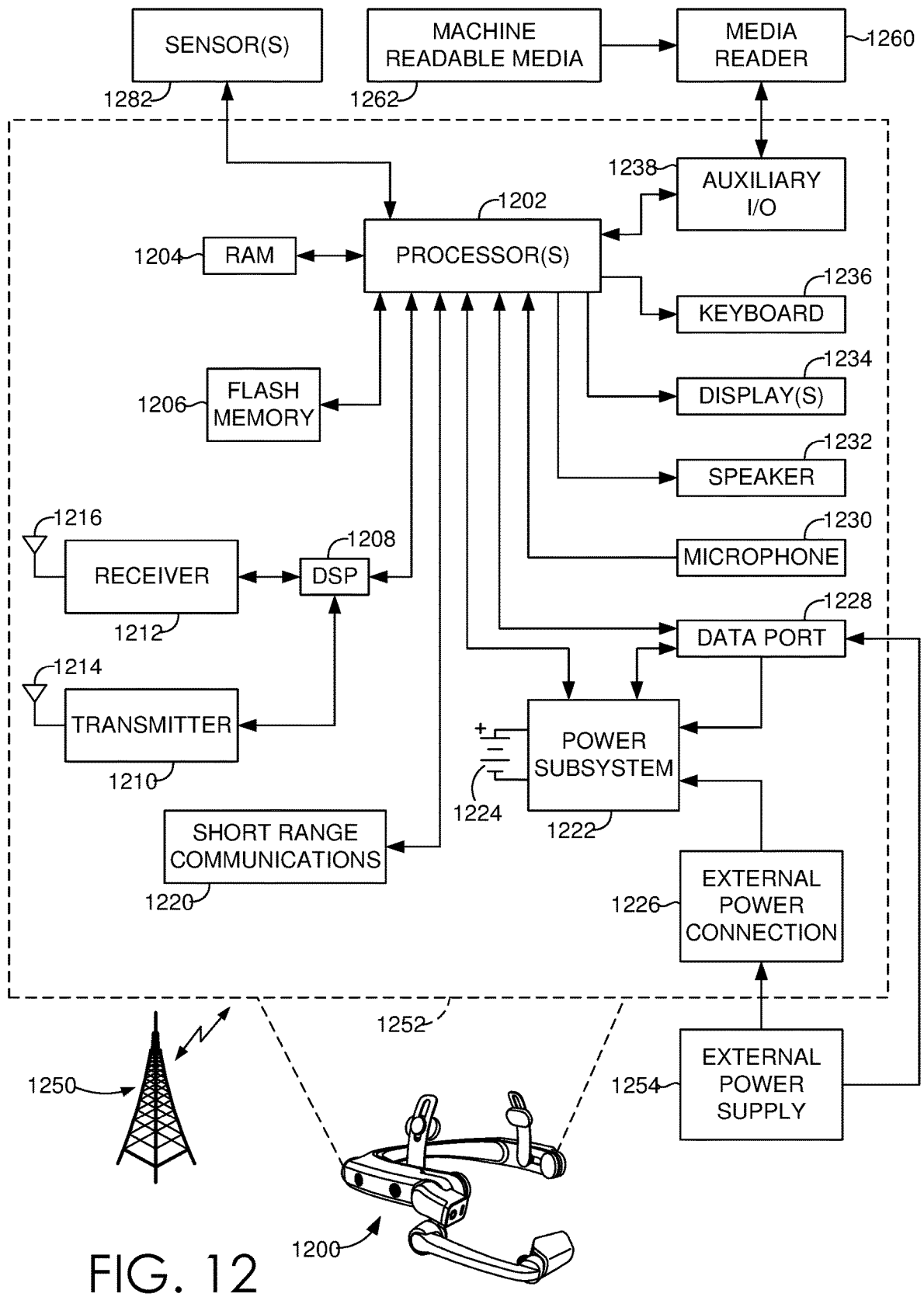
FIG. 12 provides a block diagram of an exemplary wearable device in which some implementations of the present disclosure may be employed.

FIG. 12 provides a block diagram of an exemplary wearable device 1200 in which some implementations of the present disclosure may be employed. Any of the various embodiments of wearable devices discussed herein, including but not limited to HMD device 120, 220, or 320 of FIGS. 1, 2, and 3A respectively, may include similar features, components, modules, operations, and the like as wearable device 1200. In this example, wearable device 1200 may be enabled for wireless two-way communication device with voice and data communication capabilities. Such wearable devices communicate with a wireless voice or data network 1250 using a suitable wireless communications protocol. Wireless voice communications are performed using either an analog or digital wireless communication channel. Data communications allow the wearable device 1200 to communicate with other computer systems via the Internet. Examples of wearable devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated wearable device 1200 is an examplary wearable device that includes two-way wireless communications functions. Such wearable devices incorporate communication subsystem elements such as a wireless transmitter 1210, a wireless receiver 1212, and associated components such as one or more antenna elements 1214 and 1216. A digital signal processor (DSP) 1208 performs processing to extract data from received wireless signals and to generate signals to be transmitted. The particular design of the communication subsystem is dependent upon the communication network and associated wireless communications protocols with which the device is intended to operate.

The wearable device 1200 includes a microprocessor 1202 that controls the overall operation of the wearable device 1200. The microprocessor 1202 interacts with the above described communications subsystem elements and also interacts with other device subsystems such as flash memory 1206, random access memory (RAM) 1204, auxiliary input/output (I/O) device 1238, data port 1228, display 1234, keyboard 1236, speaker 1232, microphone 1230, a short-range communications subsystem 1220, a power subsystem 1222, and any other device subsystems.

A battery 1224 is connected to a power subsystem 1222 to provide power to the circuits of the wearable device 1200. The power subsystem 1222 includes power distribution circuitry for providing power to the wearable device 1200 and also contains battery charging circuitry to manage recharging the battery 1224. The power subsystem 1222 includes a battery monitoring circuit that is operable to provide a status of one or more battery status indicators, such as remaining capacity, temperature, voltage, electrical current consumption, and the like, to various components of the wearable device 1200.

The data port 1228 is able to support data communications between the wearable device 1200 and other devices through various modes of data communications, such as high speed data transfers over an optical communications circuits or over electrical data communications circuits such as a USB connection incorporated into the data port 1228 of some examples. Data port 1228 is able to support communications with, for example, an external computer or other device.

Data communication through data port 1228 enables a user to set preferences through the external device or through a software application and extends the capabilities of the device by enabling information or software exchange through direct connections between the wearable device 1200 and external data sources rather than via a wireless data communication network. In addition to data communication, the data port 1228 provides power to the power subsystem 1222 to charge the battery 1224 or to supply power to the electronic circuits, such as microprocessor 1202, of the wearable device 1200.

Operating system software used by the microprocessor 1202 is stored in flash memory 1206. Further examples are able to use a battery backed-up RAM or other non-volatile storage data elements to store operating systems, other executable programs, or both. The operating system software, device application software, or parts thereof, are able to be temporarily loaded into volatile data storage such as RAM 1204. Data received via wireless communication signals or through wired communications are also able to be stored to RAM 1204.

The microprocessor 1202, in addition to its operating system functions, is able to execute software applications on the wearable device 1200. A predetermined set of applications that control basic device operations, including at least data and voice communication applications, is able to be installed on the wearable device 1200 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the wearable device 1200 through, for example, the wireless network 1250, an auxiliary I/O device 1238, Data port 1228, short-range communications subsystem 1220, or any combination of these interfaces. Such applications are then able to be installed by a user in the RAM 1204 or a non-volatile store for execution by the microprocessor 1202.

In a data communication mode, a received signal such as a text message or web page download is processed by the communication subsystem, including wireless receiver 1212 and wireless transmitter 1210, and communicated data is provided to the microprocessor 1202, which is able to further process the received data for output to the display 1234, or alternatively, to an auxiliary I/O device 1238 or the data port 1228. A user of the wearable device 1200 may also compose data items, such as e-mail messages, using the keyboard 1236, which is able to include a complete alpha-numeric keyboard or a telephone-type keypad, in conjunction with the display 1234 and possibly an auxiliary I/O device 1238. Such composed items are then able to be transmitted over a communication network through the communication subsystem.

For voice communications, overall operation of the wearable device 1200 is substantially similar, except that received signals are generally provided to a speaker 1232 and signals for transmission are generally produced by a microphone 1230. Alternative voice or audio I/O subsystems, such as a voice message recording subsystem, may also be implemented on the wearable device 1200. Although voice or audio signal output is generally accomplished primarily through the speaker 1232, the display 1234 may also be used to provide an indication of the identity of a calling party, the duration of a voice call, or other voice call related information, for example.

Depending on conditions or statuses of the wearable device 1200, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 1220 provides for data communication between the wearable device 1200 and different systems or devices, which need not necessarily be similar devices. For example, the short-range communications subsystem 1220 includes an infrared device and associated circuits and components or a Radio Frequency based communication module such as one supporting Bluetooth® communications, to provide for communication with similarly-enabled systems and devices, including the data file transfer communications described above.

A media reader 1260 connectable to an auxiliary I/O device 1238 to allow, for example, loading computer readable program code of a computer program product into the wearable device 1200 for storage into flash memory 1206. One example of a media reader 1260 is an optical drive such as a CD/DVD drive, which may be used to store data to and read data from a computer readable medium or storage product such as computer readable storage media 1262. Examples of suitable computer readable storage media include optical storage media such as a CD or DVD, magnetic media, or any other suitable data storage device. Media reader 1260 is alternatively able to be connected to the wearable device through the data port 1228 or computer readable program code is alternatively able to be provided to the wearable device 1200 through the wireless network 1250.

Figure 13:
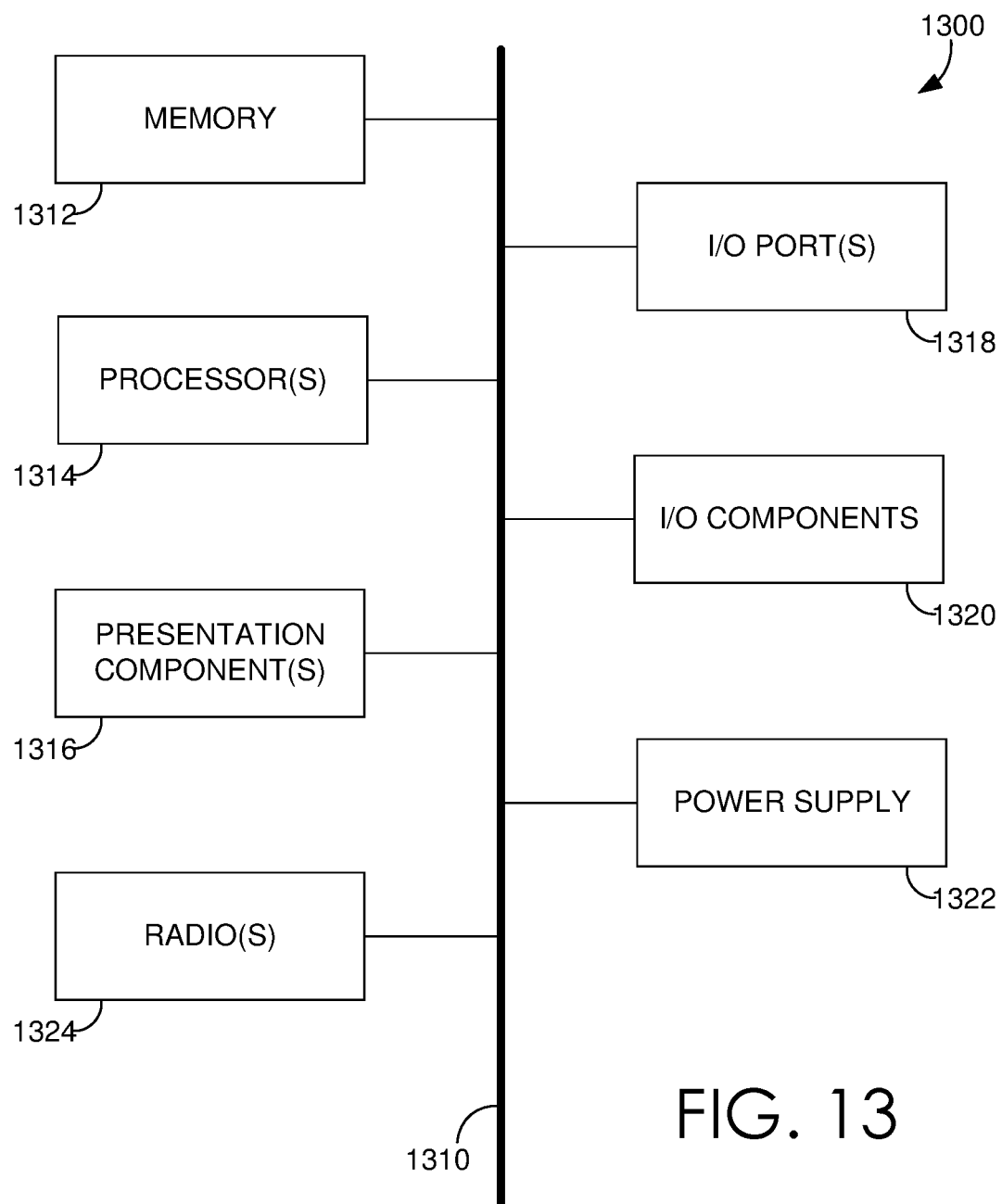
FIG. 13 provides a block diagram of an exemplary computing device in which some implementations of the present disclosure may be employed.

FIG. 13 provides a block diagram of an exemplary computing device 1300 in which some implementations of the present disclosure may be employed. Computing device 1300 is but one example of a suitable computing environment and is not intended to suggest any limitation as to the scope of use or functionality of the invention. Neither should the computing device 1300 be interpreted as having any dependency or requirement relating to any one or combination of components illustrated. Any computing device discussed herein, such as but not limited to user computing devices 102-108 of FIG. 1, or any of the wearable devices discussed herein, may include similar operations, features, components, modules, and the like, as included in computing device 1300.

The invention may be described in the general context of computer code or machine-useable instructions, including computer-executable instructions such as program modules, being executed by a computer or other machine, such as a personal data assistant or another handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 13, computing device 1300 includes a bus 1310 that directly or indirectly couples the following devices: memory 1312, one or more processors 1314, one or more presentation components 1316, input/output ports 1318, input/output components 1320, and an illustrative power supply 1322. Bus 1310 represents what may be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 13 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 13 and reference to "computing device."

Computing device 1300 typically includes a variety of computer-readable media. Computer-readable media can be any available media that can be accessed by computing device 1300 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1300. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and another wireless media. Combinations of any of the above should also be included within the scope of computer-readable media.

Memory 1312 includes computer storage media in the form of volatile and/or nonvolatile memory. The memory may be removable, non-removable, or a combination thereof. Exemplary hardware devices include solid-state memory, hard drives, optical-disc drives, etc. Computing device 1300 includes one or more processors that read data from various entities such as memory 1312 or I/O components 1320. Presentation component(s) 1316 present data indications to a user or another device. Exemplary presentation components include a display device, speaker, printing component, vibrating component, etc.

I/O ports 1318 allow computing device 1300 to be logically coupled to other devices including I/O components 1320, some of which may be built in. Illustrative components include a microphone, joystick, game pad, satellite dish, scanner, printer, wireless device, etc Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

Accordingly, in one embodiment described herein, includes a method for operating a wearable device that includes a display device (or simply a display). The method includes automatically determining a position of the display relative to a line-of-sight (LOS) of a user that is wearing the wearable device. When the position of the display is within the LOS of the user, the wearable device is operated in a first operational mode (e.g. a visual mode). When the position of the display is outside and/or excluded from the LOS of the user, the wearable device is operated in a second operational mode (e.g. and audible mode). In some non-limiting embodiments, the wearable device is a head-mounted display (HMD) device. The display may be configured and arranged such that the position of the display relative to the LOS rotates about an axis of the user. For instance, the position of the display may rotate about a frontal axis of the user.

In some embodiments, the wearable device includes a first member and a second member. Determining the position of the display may include determining a relative rotational orientation between a first member and a second member. The first and second members are configured and arranged such that s variance of the rotational orientation between the first member and the second member generates a variance between the first member and the display. Determining the position of the display may be based on receiving a signal generated by a sensor and/or switch included in the wearable device, such as but not limited to a Hall effect sensor and/or switch.

Operating the wearable device in the first operational mode may include employing the display to provide the user a visual indication of a notification. Operating the wearable device in the second operational mode may include employing an electroacoustic transducer (e.g. an audio speaker) included in the wearable device to provide the user an audible indication of the notification. For instance, a information included in the notification may be provided as a computer-generated (or a human generated) vocalization of the information (e.g. spoken word).

In some embodiments, operating the wearable device in the first operational mode includes operating a first electroacoustic transducer (e.g. a primary microphone) included in the wearable device. Operating the wearable device in the second operational mode includes operating one or more other electroacoustic transducers (e.g. auxiliary and/or additional microphones) included in the wearable device.

In various embodiments, the method further includes determining a feature of content to provide to the user. When the feature of the content is associated with a visual-only condition, an audio speaker included in the wearable device is employed to provide the user an audible indication regarding the content is associated with a visual-only condition. For instance, the wearable device may provide a vocalization of a request to reposition the display within their LOS so that they may view the visual-only content, as it is provided via the display. When the feature of the content is associated with a visual-optional condition, the audio speaker is employed to provide the user an audible indication of the content.

In at least one embodiment, operating the wearable device in the first operational mode includes employing the display to provide the user a visual indication of a first user-option and a visual indication of a second user-option. For instance, the display may show two separate icons, each corresponding to a separate document that the user may select to view via the display. Operating the wearable device in the second operational mode includes employing an audio speaker included in the wearable device to provide the user an audible indication of the first user-option and an audible indication of the second user-option. For instance, a computer generated voice may ask the user which of the two documents to select, via vocalizing at least the an identifier for each of the documents. In at least one embodiment, upon selection (via a voice command by the user), the computer-generated voice may read at least a portion of the content of the selected document to the user.

In some embodiments, operating the wearable device in the first operational mode further includes employing a microphone of the wearable device to receive an audible indication of a user-selection (e.g a selection indicated by a voice-command by the user) of one of the first user-option or the second user-option. Operating the wearable device in the second operational mode further includes employing a selection component (e.g. physical buttons, switches, or the like) included in the wearable device, to receive a non-audible indication of the user-selection (e.g. a selection indicated by a physical gesture such as selecting a button) of one of the first user-option or the second user-option.

The wearable device may further include a camera and a photon-emitter. Operating the wearable device in the second operational mode includes employing the photon-emitter to project a visual indication of a field-of-view (FOV) of the camera. For instance, the photon-emitter may include a laser or a collimated light emitting diode (LED) to project photon beams to trace a boundary of the FOV on surfaces at the boundary of the FOV of the camera. Or in other embodiments, the photon-emitter may project a dot, a bullseye, a cursor, or some other indicator on a physical surface that is located at the center of the FOV.

In various embodiments, the method further includes receiving an instruction to provide a visual element. An audible indication of the visual element may be determined. The method further employs an audio speaker of the wearable device to provide the audible indication of the visual element.

Other embodiments include a non-transitory computer storage media that stores instruction. When executed by a processor, the processor is enabled to perform a method or actions for operating a wearable device that includes a display and a frame structure, such as a frame member. The actions include detecting a first orientation of a display. The first orientation of the display includes a first position of the display relative to a frame structure. In response to detecting the first orientation of the display, the wearable device is operated in a first operational mode. The actions further include detecting a transition from the first orientation of the display to a second orientation of the display. The second orientation of the display includes a second position of the display relative to the frame structure. The second position is separate or different than the first position. In response to detecting the transition from the first orientation of the display to the second orientation of the display, operating the wearable device is transitioned from the first operational mode to a second operational mode.

In some embodiments, the first position of the display is such that the display is within the line-of-sight (LOS) of a user that is wearing the wearable device and the second position of the display is such that the display is outside of or excluded from the LOS of the user. In such embodiments, the first operational mode may be a visual mode and the second operational mode is an audible mode. In other embodiments, the first position of the display is such that the display is excluded from the LOS of the user and the second position of the display is such that the display is within the LOS of the user. In these embodiments, the first operational mode may be an audible mode and the second operational mode is a visual mode. In various embodiments, detecting the transition from the first orientation of the display to the second orientation of the display includes detecting a rotation of a member of the wearable device relative to the frame structure of the wearable device.

In at least one embodiment, operating the wearable device in the first operational mode includes providing the user, by the display, a visual indication of content. Operating the wearable device in the second operational mode includes providing the user, via a speaker included in the wearable device, an audible indication of the content. Transition operating the wearable device in the first operational mode to operating the wearable device in the second operational mode may include activating at least one microphone included in the wearable device. The microphone may be deactivated during operating the wearable device in the first operational mode. For instance, an auxiliary microphone may be turned on when the operational mode is transitioned to audible mode. The auxiliary microphone may be turned off in the visual mode of the wearable device. A primary microphone of the wearable device may be activated during the visual mode. In some embodiments, the primary microphone is also activated during operation in the audible mode. In other embodiments, the primary microphone is deactivated during the transition from the visual mode to the audible mode.

Still another embodiment is directed towards a wearable device, such as but not limited to a head-mounted display (HMD) device. The wearable device includes a frame member, a rotating member, a processor, and at least one non-transitory computer storage media. The frame member is configured and arranged for wearing by a user. The rotating member is rotatable coupled to the frame member and configured and arranged for rotating relative to the frame member. The computer storage media stored computer-usable instructions that, when executed by the processor cause the processor to perform a method or actions for operating the wearable device. The actions include determining a relative angle between the frame member and the rotating member. When the relative angle is less than a predetermined threshold-angle, the wearable device is operated in a first operational mode. When the relative angle is greater than the predetermined threshold-angle, the wearable device is operated in a second operational mode. In some embodiments, the first operational mode is a visual mode and the second operational mode is an audible mode. In other embodiments, the first operational mode is an audible mode and the second operational mode is a visual mode.

In various embodiments, the wearable device further includes a positioning-sensing sensor and/or switch, such as a Hall effect switch. In such embodiments, determining the relative angle between the frame member and the rotating member may be based on a signal generated by the Hall Effect switch. In at least one embodiment, the wearable device includes a photon-detector (e.g. a camera) and a photon-emitter (e.g. a laser or a collimated light emitting diode). When operating the wearable device in the audible mode, the actions may further include determining a field-of-view (FOV) of the photon-detector. The photon-emitter may be employed to project a visual indicator of a boundary and/or a center of the FOV of the photon-detector.

Many variations can be made to the illustrated embodiments of the present invention without departing from the scope of the present invention. Such modifications are within the scope of the present invention. Embodiments presented herein have been described in relation to particular embodiments which are intended in all respects to be illustrative rather than restrictive. Alternative embodiments and modifications would be readily apparent to one of ordinary skill in the art, but would not depart from the scope of the present invention.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the invention.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B, and C" means "(A), (B), (C), (A and B), (A and C), (B and C), or (A, B, and C)."

What is claimed is:

1. A method for operating a head-mounted display (HMD) device that presents a user interface (UI) presenting information to a user, the HMD device including a display and a frame configured to be worn on a head of the user, comprising:
   in response to detecting a transition in an orientation of the display relative to the frame, transitioning a mode of operation of the HMD device from a first mode to a second mode, wherein the information presented by the UI in the first mode includes visual-based content and the information presented by the UI in the second mode includes audible-based content and excludes the visual-based content.

2. The method of claim 1, wherein the HMD device further includes a boom arm that rotatably couples the display to the frame and detecting the transition in the orientation of the display comprises:
   detecting a relative rotation between the boom arm and the frame.

3. The method of claim 1, wherein the HMD device further includes one or more sensors and the method further comprises:
   receiving one or more signals generated by the one or more sensors;
   based on the received one or more signals, detecting a relative motion between the display and the frame; and
   in response to detecting the relative motion between the display and the frame, detecting the transition in the orientation of the display.

4. The method of claim 3, wherein the one or more sensors are position-detecting sensors and include at least one of a Hall Effect sensor, a Hall Effect switch, an optical sensor, a mechanical switch, a capacitive sensor, a conductive switch, or a magnetic switch.

5. The method of claim 1, wherein the first mode is an audible mode of operation of the HMD device and the second mode is a visual mode of operation of the HMD device.

6. The method of claim 1, wherein the first mode is a visual mode of operation of the HMD device and the second mode is an audible mode of operation of the HMD device.

7. The method of claim 1, wherein the transition in the orientation of the display relative to the frame causes transitioning a position of the display between a first position that is within a line-of-sight (LOS) of the user and a second position that is excluded from the LOS of the user.

8. A head-mounted display (HMD) device that provides a user interface (UI) to a user, comprising:
   a display device;
   a speaker device;
   a frame configured to be worn on a head of a user;
   at least one processor device; and
   at least one computer-readable storage media storing computer-useable instructions that, when executed by the at least one processor device, causes that at least one processor device to perform action for operating the HMD device, where in the actions comprise:
   in response to detecting a transition in an orientation of the display device relative to the frame, transitioning a mode of operation of the HMD device from a first mode to a second mode, wherein, in the first mode, the UI causes the display device to provide visual-based content to the user and, in the second mode, the UI causes the speaker device to provide audible-based content to the user.

9. The HMD device of claim 8, further comprising:
   a boom arm that rotatably couples the display to the frame, and wherein an detecting the transition in the orientation of the display includes detecting a relative rotation between the boom arm and the frame.

10. The HMD device of claim 8, further comprising one or more sensor devices and the actions further comprise:
   receiving, at the one or more processor devices, one or more signals generated by the one or more sensor devices;
   based on the received one or more signals, detecting a relative motion between the display and the frame; and
   in response to detecting the relative motion between the display and the frame, detecting the transition in the orientation of the display.

11. The HMD device of claim 10, wherein the one or more sensor devices are position-detecting sensor devices and include at least one of a Hall Effect sensor, a Hall Effect switch, an optical sensor, a mechanical switch, a capacitive sensor, a conductive switch, or a magnetic switch.

12. The HMD device of claim 8, wherein the first mode is an audible mode of operation of the HMD device and the second mode is a visual mode of operation of the HMD device.

13. The HMD device of claim 8, wherein the first mode is a visual mode of operation of the HMD device and the second mode is an audible mode of operation of the HMD device.

14. The HMD device of claim 8, wherein the transition in the orientation of the display relative to the frame causes transitioning a position of the display between a first position that is within a line-of-sight (LOS) of the user and a second position that is excluded from the LOS of the user.

15. A non-transitory computer-readable storage medium having instructions stored thereon for operating a head-mounted display (HMD) device, which presents a user interface (UI), the HMD device including a display and a frame configured to be worn on a head of a user, which, when executed by a processor of the HMD device cause the HMD device to perform actions comprising:
   in response to determining a change in a position of the display relative to a headset of the HMD device, updating a mode of operation of the HMD device from a visual mode, which presents the UI via visual-based content, to an audio mode, which presents the UI via audible-based content.

16. The computer-readable storage medium of claim 15, wherein the HMD device further includes a boom arm that rotatably couples the display to the frame and detecting the transition in the orientation of the display comprises:
   detecting a relative rotation between the boom arm and the frame.

17. The computer-readable storage medium of claim 15, wherein the HMD device further includes one or more sensors and the actions further comprise:
   receiving one or more signals generated by the one or more sensors;
   based on the received one or more signals, detecting a relative motion between the display and the frame; and
   in response to detecting the relative motion between the display and the frame, detecting the transition in the orientation of the display.

18. The computer-readable storage medium of claim 17, wherein the one or more sensors are position-detecting sensors and include at least one of a Hall Effect sensor, a Hall Effect switch, an optical sensor, a mechanical switch, a capacitive sensor, a conductive switch, or a magnetic switch.

19. The computer-readable storage medium of claim 15, wherein one of the first mode or the second mode is an audible mode of operation of the HMD device and another of the first mode or second mode is a visual mode of operation of the HMD device.

20. The computer-readable storage medium of claim 15, wherein the transition in the orientation of the display relative to the frame causes transitioning a position of the display between a first position that is within a line-of-sight (LOS) of the user and a second position that is excluded from the LOS of the user.

* * * * *